United States Patent
Domroese et al.

(10) Patent No.: US 11,173,015 B2
(45) Date of Patent: Nov. 16, 2021

(54) REMOVABLE DENTAL APPLIANCE INCLUDING SPRING MEMBER

(71) Applicant: 3M INNOVATIVE PROPERTIES COMPANY, St. Paul, MN (US)

(72) Inventors: Michael K. Domroese, Woodbury, MN (US); David K. Cinader, Jr., Woodbury, MN (US); James D. Hansen, White Bear Lake, MN (US); Richard E. Raby, Lino Lakes, MN (US); Ralf M. Paehl, Melle (DE)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 16/753,886

(22) PCT Filed: Sep. 18, 2018

(86) PCT No.: PCT/IB2018/057184
§ 371 (c)(1),
(2) Date: Apr. 6, 2020

(87) PCT Pub. No.: WO2019/069166
PCT Pub. Date: Apr. 11, 2019

(65) Prior Publication Data
US 2020/0281690 A1    Sep. 10, 2020

Related U.S. Application Data

(60) Provisional application No. 62/569,156, filed on Oct. 6, 2017.

(51) Int. Cl.
*A61C 7/08*    (2006.01)
*A61C 7/14*    (2006.01)
*A61C 9/00*    (2006.01)

(52) U.S. Cl.
CPC ............... *A61C 7/08* (2013.01); *A61C 7/14* (2013.01); *A61C 9/0053* (2013.01)

(58) Field of Classification Search
CPC ........... A61C 7/08; A61C 7/14; A61C 9/0053; A61C 19/063; A63B 71/085
See application file for complete search history.

(56) References Cited

U.S. PATENT DOCUMENTS 3,407,500 A * 10/1968 Kesling .................... A61C 7/08
                                                                  433/6
4,526,540 A *  7/1985 Dellinger ............... A61C 7/146
                                                                 433/24

(Continued)

FOREIGN PATENT DOCUMENTS

JP    2003038520    2/2003
JP    2011517603    6/2011

(Continued)

OTHER PUBLICATIONS

International Search Report for PCT International Application No. PCT/IB2018/057184, dated Jan. 3, 2019, 5 pages.

*Primary Examiner* — Nicholas D Lucchesi
(74) *Attorney, Agent, or Firm* — 3M IPC

(57) ABSTRACT

A removable dental appliance may include an appliance body configured to at least partially surround a plurality of teeth of a dental arch of a patient. The appliance body may include a unitary material defining a shell shaped to receive at least one tooth of the patient and a spring member integrally formed with the shell. The spring member may be configured to receive an attachment. The attachment may be configured to affix to the at least one tooth. The spring member may be configured to apply a spring force to the attachment to cause at least one of a rotation, a translation, a tipping, a torqueing, an extrusion, or an intrusion of the at (Continued)

least one tooth toward a desired position of the tooth when the removable dental appliance is worn by the patient.

19 Claims, 16 Drawing Sheets

(56) References Cited

U.S. PATENT DOCUMENTS

| | | | | |
|---|---|---|---|---|
| 4,551,096 A * | 11/1985 | Dellinger | ............... | A61C 7/146 |
| | | | | 433/24 |
| 4,856,991 A * | 8/1989 | Breads | ............... | A61C 7/08 |
| | | | | 433/6 |
| 5,055,039 A * | 10/1991 | Abbatte | ............... | A61C 7/08 |
| | | | | 433/24 |
| 5,186,623 A * | 2/1993 | Breads | ............... | A61C 7/08 |
| | | | | 433/214 |
| 5,312,247 A | 5/1994 | Sachdeva | | |
| 6,183,248 B1 * | 2/2001 | Chishti | ............... | A61C 7/00 |
| | | | | 433/6 |
| 6,514,074 B1 * | 2/2003 | Chishti | ............... | A61C 7/00 |
| | | | | 433/24 |
| 6,572,372 B1 | 6/2003 | Phan | | |
| 6,830,450 B2 * | 12/2004 | Knopp | ............... | B29C 43/02 |
| | | | | 433/6 |
| 6,845,175 B2 | 1/2005 | Kopelman | | |
| 7,011,518 B2 | 3/2006 | DeLuke | | |
| 7,027,642 B2 | 4/2006 | Rubbert | | |
| 7,056,115 B2 * | 6/2006 | Phan | ............... | A61C 7/002 |
| | | | | 433/24 |
| 7,059,850 B1 * | 6/2006 | Phan | ............... | A61C 7/00 |
| | | | | 433/24 |
| 7,063,533 B2 * | 6/2006 | Phan | ............... | A61C 7/00 |
| | | | | 433/24 |
| 7,125,248 B2 * | 10/2006 | Phan | ............... | A61C 7/00 |
| 7,234,937 B2 | 6/2007 | Sachdeva | | |
| 7,731,495 B2 | 6/2010 | Eisenberg | | |
| 8,194,067 B2 | 6/2012 | Raby | | |
| 8,491,306 B2 | 7/2013 | Raby | | |
| 8,641,414 B2 * | 2/2014 | Borovinskih | ............ | A61C 7/08 |
| | | | | 433/6 |
| 8,651,857 B2 | 2/2014 | Geenty | | |
| 8,708,697 B2 * | 4/2014 | Li | ............... | A61C 7/14 |
| | | | | 433/6 |
| 8,738,165 B2 | 5/2014 | Cinader, Jr. | | |
| 8,986,003 B2 * | 3/2015 | Valoir | ............... | A61C 7/08 |
| | | | | 433/6 |
| 9,022,781 B2 * | 5/2015 | Kuo | ............... | A61C 7/20 |
| | | | | 433/24 |
| 9,060,829 B2 * | 6/2015 | Sterental | ............... | G16H 50/50 |
| 9,119,691 B2 * | 9/2015 | Namiranian | ............... | A61C 7/10 |
| 9,345,557 B2 | 5/2016 | Anderson | | |
| 9,532,854 B2 | 1/2017 | Cinader, Jr. | | |
| 10,555,792 B2 * | 2/2020 | Kopelman | ............... | A61C 7/14 |
| 2003/0198911 A1 | 10/2003 | Knopp et al. | | |
| 2004/0009449 A1 | 1/2004 | Mah | | |
| 2004/0029068 A1 | 2/2004 | Sachdeva | | |
| 2006/0093983 A1 | 5/2006 | Schultz | | |
| 2007/0031791 A1 | 2/2007 | Cinader, Jr. | | |
| 2007/0065768 A1 | 3/2007 | Nadav | | |
| 2008/0020337 A1 | 1/2008 | Phan | | |
| 2009/0098500 A1 | 4/2009 | Diaz Rendon | | |
| 2009/0148803 A1 | 6/2009 | Kuo | | |
| 2011/0020761 A1 * | 1/2011 | Kalili | ............... | A61C 7/08 |
| | | | | 433/6 |
| 2012/0270174 A1 | 10/2012 | Meley | | |
| 2013/0325431 A1 | 12/2013 | See | | |
| 2014/0363779 A1 | 12/2014 | Kopelman | | |
| 2015/0140501 A1 | 5/2015 | Kim | | |
| 2015/0157421 A1 | 6/2015 | Martz | | |
| 2015/0216627 A1 | 8/2015 | Kopelman | | |
| 2016/0067014 A1 | 3/2016 | Kottemann | | |
| 2016/0193014 A1 | 7/2016 | Morton | | |
| 2016/0310236 A1 | 10/2016 | Kopelman | | |
| 2017/0007366 A1 | 1/2017 | Kopelman | | |
| 2017/0065373 A1 | 3/2017 | Martz | | |
| 2017/0105817 A1 | 4/2017 | Chun et al. | | |

FOREIGN PATENT DOCUMENTS

| | | |
|---|---|---|
| JP | 2011212132 | 10/2011 |
| KR | 1020100109898 | 10/2010 |
| KR | 200465679 | 3/2013 |
| KR | 1020150119597 | 10/2015 |
| KR | 1020170071155 | 6/2017 |
| KR | 1020170102471 | 9/2017 |
| WO | WO 2006-096558 | 9/2006 |
| WO | WO 2007-084727 | 7/2007 |
| WO | WO 2014-128423 | 8/2014 |
| WO | WO 2015-114450 | 8/2015 |
| WO | WO 2015-140614 | 9/2015 |
| WO | WO 2019-023166 | 1/2019 |
| WO | WO 2019-069162 | 4/2019 |
| WO | WO 2019-069163 | 4/2019 |
| WO | WO 2019-069164 | 4/2019 |
| WO | WO 2019-069165 | 4/2019 |
| WO | WO 2019-069268 | 4/2019 |

* cited by examiner

REMOVABLE DENTAL APPLIANCE INCLUDING SPRING MEMBER

CROSS REFERENCE TO RELATED APPLICATIONS

This application is a national stage filing under 35 U.S.C. 371 of PCT/IB2018/057184, filed Sep. 18, 2018, which claims the benefit of provisional Application No. 62/569,156, filed Oct. 6, 2017, the disclosure of which is incorporated by reference in its/their entirety herein.

TECHNICAL FIELD

This disclosure relates to polymer-based removable dental appliances such as tooth aligner trays.

BACKGROUND

The field of orthodontics relates to repositioning teeth of a patient for improved function and aesthetic appearance. Orthodontic devices and treatment methods generally involve the application of forces to move teeth into a proper bite configuration, or occlusion. As one example, orthodontic treatment may involve the use of slotted appliances, known as brackets, which are fixed to the patient's anterior, cuspid, and bicuspid teeth. An archwire is typically placed in the slot of each bracket and serves as a track to guide movement of the teeth to desired orientations. The ends of the archwire are usually received in appliances known as buccal tubes that are secured to the patient's molar teeth. Such dental appliances remain in the mouth of the patient and are periodically adjusted by an orthodontist to check the process and maintain the proper pressure against the teeth until proper alignment is achieved.

Orthodontic treatment may also involve the use of polymer-based tooth aligner trays, such as a clear tray aligner (CTAs). For example, orthodontic treatment with CTAs may include forming a tray having shells that couple one or more teeth. Each shell may be deformed from an initial position of a tooth, e.g., a maloccluded position. The deformed position may be between the initial position and a desired position resulting from the orthodontic treatment. The deformed position of a respective shell of the CTA may apply a force to a respective tooth toward the desired position.

SUMMARY

This disclosure describes removable dental appliances, such as aligner trays, that include an appliance body including a shell and a spring member formed therein to apply a spring force to an attachment affixed to a tooth and cause movement of the tooth toward a desired position, and methods for making the same.

In some examples, the disclosure describes a removable dental appliance including an appliance body configured to at least partially surround a plurality of teeth of a dental arch of a patient. The appliance body includes a unitary material defining a shell shaped to receive at least one tooth of the patient and a spring member integrally formed with the shell. The spring member is configured to receive an attachment. The attachment is configured to affix to the at least one tooth. The spring member is configured to apply a spring force to the attachment to cause at least one of a rotation, a translation, a tipping, a torqueing, an extrusion, or an intrusion of the at least one tooth toward a desired position of the tooth when the removable dental appliance is worn by the patient.

In some examples, the disclosure describes a system including an ordered set of removable dental appliances configured to reposition one or more teeth of a patient. Each removable dental appliance in the set of removable dental appliances includes an appliance body configured to at least partially surround a plurality of teeth of a dental arch of a patient. The appliance body includes a unitary material defining a shell shaped to receive at least one tooth of the patient and a spring member integrally formed with the shell. The spring member is configured to receive an attachment. The attachment is configured to affix to the at least one tooth. The spring member is configured to apply a spring force to the attachment to cause at least one of a rotation, a translation, a tipping, a torqueing, an extrusion, or an intrusion of the at least one tooth toward a desired position of the tooth when the removable dental appliance is worn by the patient.

In some examples, the disclosure describes a method including forming a model of dental anatomy of a patient; and forming, based on the model, a removable dental appliance. The removable dental appliance includes an appliance body configured to at least partially surround a plurality of teeth of a dental arch of a patient. The appliance body includes a unitary material defining a shell shaped to receive at least one tooth of the patient and a spring member integrally formed with the shell. The spring member is configured to receive an attachment. The attachment is configured to affix to the at least one tooth. The spring member is configured to apply a spring force to the attachment to cause at least one of a rotation, a translation, a tipping, a torqueing, an extrusion, or an intrusion of the at least one tooth toward a desired position of the tooth when the removable dental appliance is worn by the patient.

In some examples, the disclosure describes a method including receiving, by a computer, a digital representation of a three-dimensional (3D) dental anatomy of a patient, the dental anatomy providing initial positions of one or more teeth of the patient. The method also includes determining, by the computer, dimensions and shapes of a removable dental appliance for the patient. The removable dental appliance includes an appliance body configured to at least partially surround a plurality of teeth of a dental arch of a patient. The appliance body includes a unitary material defining a shell shaped to receive at least one tooth of the patient and a spring member integrally formed with the shell. The spring member is configured to receive an attachment. The attachment is configured to affix to the at least one tooth. The spring member is configured to apply a spring force to the attachment to cause at least one of a rotation, a translation, a tipping, a torqueing, an extrusion, or an intrusion of the at least one tooth toward a desired position of the tooth when the removable dental appliance is worn by the patient. The dimensions and shapes of the removable dental appliance are configured to reposition the one or more teeth of the patient from an initial position to a desired position when the removable dental appliance is worn by the patient. The dimensions and shapes of the removable dental appliance include a position, dimension, and shape of the shell; a position, dimension, and shape of the attachment; and a position, dimension, and shape of the spring member. The method also includes transmitting, by the computer, a representation of the removable dental appliance to a computer-aided manufacturing system.

In some examples, the disclosure describes a non-transitory computer-readable storage medium that stores computer system-executable instructions that, when executed, configure a processor to receive, by a computer, a digital representation of a three-dimensional (3D) dental anatomy of a patient, the dental anatomy providing initial positions of one or more teeth of the patient. The non-transitory computer-readable storage medium also stores computer system-executable instructions that, when executed, configure the processor to determine, by the computer, dimensions and shapes of a removable dental appliance for the patient. The removable dental appliance includes an appliance body configured to at least partially surround a plurality of teeth of a dental arch of the patient. The appliance body includes a unitary material defining a shell shaped to receive at least one tooth of the patient and a spring member integrally formed with the shell. The spring member is configured to receive an attachment. The attachment is configured to affix to the at least one tooth. The spring member is configured to apply a spring force to the attachment to cause at least one of a rotation, a translation, a tipping, a torqueing, an extrusion, or an intrusion of the at least one tooth toward a desired position of the tooth when the removable dental appliance is worn by the patient. The dimensions and shapes of the removable dental appliance are configured to reposition the one or more teeth of the patient from an initial position to a desired position when the removable dental appliance is worn by the patient. The dimensions and shapes of the removable dental appliance include a position, dimension, and shape of the shell; a position, dimension, and shape of the attachment; and a position, dimension, and shape of the spring member. The non-transitory computer-readable storage medium also stores computer system-executable instructions that, when executed, configure the processor to transmit, by the computer, a representation of the removable dental appliance to a computer-aided manufacturing system.

The details of one or more examples of this disclosure are set forth in the accompanying drawings and the description below. Other features, objects, and advantages of this disclosure will be apparent from the description and drawings, and from the claims.

DETAILED DESCRIPTION

This disclosure describes removable dental appliances that include an appliance body including a shell and a spring member, and methods for making the same. In some examples, the removable dental appliance may be a dental aligner tray. The spring member may be configured to apply a spring force to an attachment affixed to a tooth. The spring force may cause at least one of a rotation, a translation, a tipping, a torqueing, an extrusion, or an intrusion of the tooth toward a desired position for tooth when the removable dental appliance is worn by the patient. The appliance body includes a unitary material that forms both the shell and the spring member. The appliance body is configured to surround a plurality of teeth of a dental arch of a patient.

In some examples, the appliance body may also include a positioning member to facilitate engagement of the spring member with the attachment in response to a positioning force being applied to the positioning member. For example, the spring member or other portions of the appliance body may deform in response to the positioning force to engage the attachment. The spring member may apply a spring force to the attachment in response to the deformation, e.g., a restorative force in which the spring member is moving toward an undeformed configuration. The restorative force may cause movement of the at least one tooth toward the desired position when the removable dental appliance is worn by the patient.

In some examples, by concentrating the deformation in the spring member, a respective shell may remain more highly engaged with a respective tooth. For example, when the removable dental appliance is in a deformed state, e.g., worn by the patient, the shells may have more points of contact with a respective tooth, a greater surface area of contact on a respective tooth, or the like, compared to a removable dental appliances without the spring member. By separating the force generating member (the spring member) and the engagement member (the shells), the removable dental appliances may allow greater control of forces applied to teeth.

Additionally, the spring member may be configured to apply a spring force to the attachment to cause tooth movements that may be more difficult to achieve with aligner trays that do not include a spring member, such as at least one of a rotation, a tipping, a torqueing, an extrusion, an intrusion, or the like. For example, the attachment and the spring member may be positioned and shaped to provide specific force vectors to the tooth. The spring force may be applied to the attachment in a direction or a magnitude that may not be possible to apply to a surface of the tooth without the attachment and spring member. In this way, the use of a spring member may improve control of force vector direction, magnitude, or both, to achieve a desired tooth movement over a shortened treatment time compared to other orthodontic appliances.

Figure 1A:
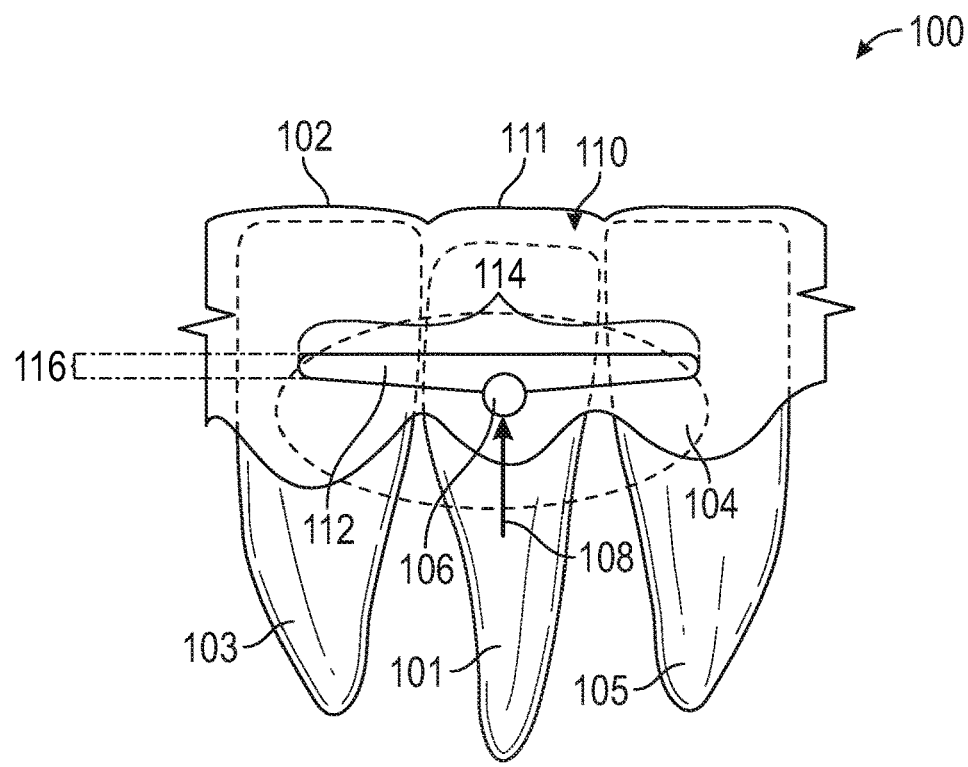
FIGS. 1A-1D illustrate facial views of an example removable dental appliance that includes a shell and a spring member to engage an attachment to facilitate a movement of a tooth of a patient.
Figure 1B:
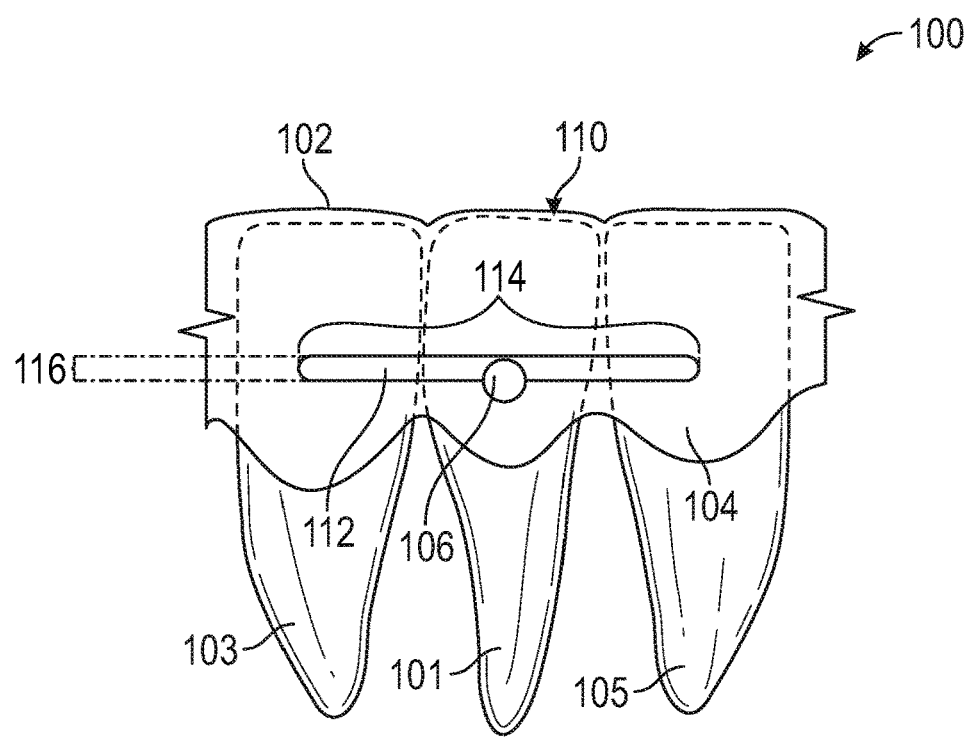
Figure 1C:
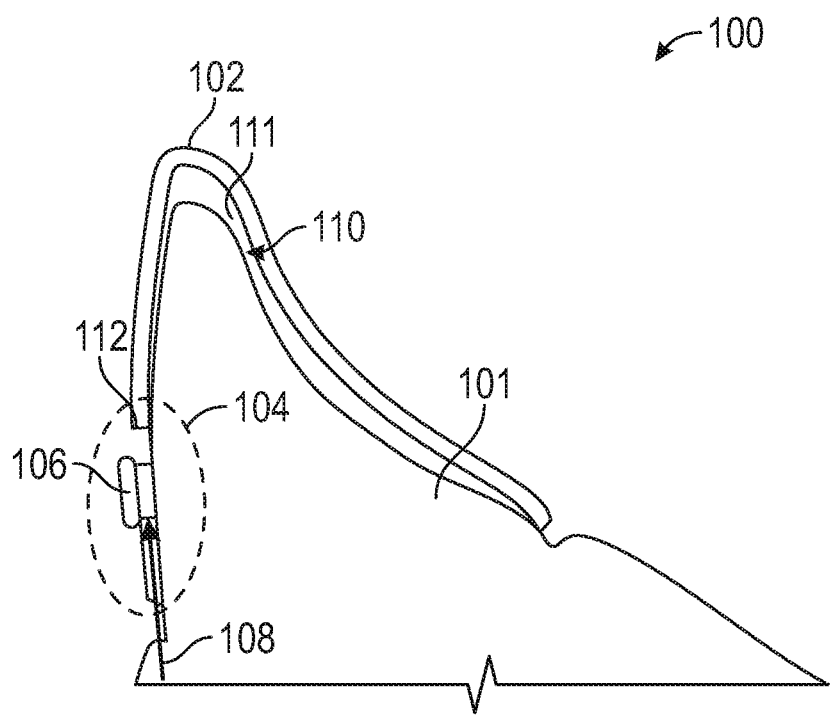
Figure 1D:
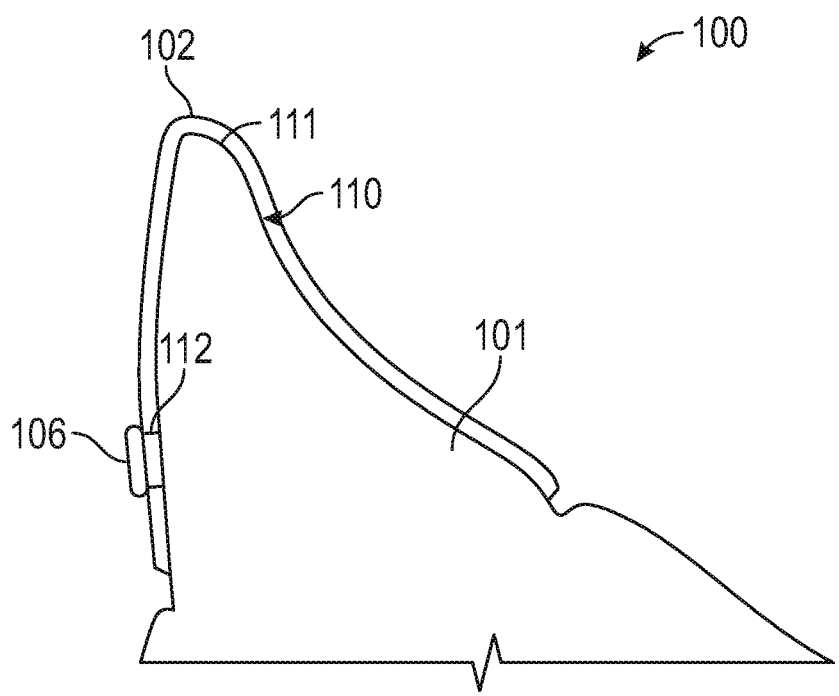

FIGS. 1A-1D illustrate facial and cross-sectional views of a portion of example removable dental appliance 100 that includes a spring member 104 configured to engage an attachment 106 on a tooth 101 of the patient. Removable dental appliance 100 may include an aligner tray, such as, for example, a clear tray aligner. FIG. 1A shows a facial view of a portion of removable dental appliance 100 surrounding three anterior teeth 101, 103, and 105 of the patient, where teeth 101, 103, and 105 are in an initial position, e.g., a maloccluded position. FIG. 1B shows a facial view of a portion of removable dental appliance 100 surrounding three anterior teeth 101, 103, and 105 of the patient, where teeth 101, 103, and 105 are in a desired position, e.g., a final position after orthodontic treatment or an intermediate position achieved by use of removable dental appliance 100. FIG. 1C shows a cross-sectional view of a portion of removable dental appliance 100 surrounding an anterior tooth 101 of the patient, where tooth 101 is in an initial position, e.g., a maloccluded position. FIG. 1D shows a cross-sectional view of a portion of removable dental appliance 100 surrounding anterior tooth 101 of a patient, where tooth 101 is in a desired position, e.g., a final position after orthodontic treatment or an intermediate position achieved by use of removable dental appliance 100.

Removable dental appliance 100 includes appliance body 102. Appliance body 102 is configured to at least partially surround a plurality of teeth of either the maxillary dental arch or the mandibular dental arch of a patient. The plurality of teeth may include anterior teeth, posterior teeth, or portions or combinations thereof.

Appliance body 102 includes at least one shell 110. In some examples, at least one shell 110 may surround the facial, lingual, and occlusal portions of the teeth. In other examples, at least one shell 110 may surround fewer portions of one or more teeth, such as, for example, only the facial and lingual portions, or only one of the facial, lingual, or occlusal portions. At least one shell 110 may be shaped to correspond to a desired position of at least one tooth (e.g., one or more of tooth 101, tooth 103, or tooth 105), e.g., a final position or an intermediate position different from a current position of the at least one tooth. For example, shell 110 may include a surface 111 that defines a void internal to shell 110 and may be shaped to receive at least one portion (e.g., at least one surface) of tooth 101.

During orthodontic treatment, shell 110 and surface 111 may define limits of movement of tooth 101. For example, as tooth 101 is extruded, tooth 101 may move through the void defined by surface 111. Tooth 101 may stop moving when tooth 101 contacts at least a portion of surface 111, which may also correspond to a position at which a spring force 108 exerted by spring member 104 falls below a threshold force required to cause movement of tooth 101. In some examples, if only a portion of tooth 101 contacts surface 111, while gaps remain elsewhere, a couple may be formed between the contact point with surface 111 and spring force 108. The resulting couple may cause tooth 101 to move into a position of greater alignment with surface 111. For example, tooth 101 may move in stages of alternating translation and rotation, until tooth 101 is fully received in a position of conformity with the surface 111. In some examples, surface 111 may be positioned to allow tooth 101 to overcorrect, e.g., to move past the desired position. The amount of overcorrection maybe predetermined to reduce the effect of relapse of tooth 101 after the orthodontic treatment is ended, e.g., an anticipated relapse may move tooth 101 into the desired position. In this way, selecting the shape of shell 110 and surface 111 may enable control of the locations of a force and resulting movement of tooth 101.

Appliance body 102 includes at least one spring member 104 configured to engage attachment 106. In some examples, attachment 106 is affixed to tooth 101 to provide a purchase point, such as, e.g., an undercut, a protrusion, a knob, a handle, or the like, onto which a force may be applied. In other examples, natural undercuts or purchase points, such as, e.g., highly curved portions of a tooth, including but not limited to, a cusp tip or cervical contour, may define attachment 106. Generally, attachment 106 may be selected to facilitate engagement and securement of appliance body 102 on the dental arch of the patient. For example, attachment 106 may be beveled on an occlusal side to reduce conflict with appliance body 102 when removable dental appliance is fitted to tooth 101, an undercut on a gingival side to improve retention of the appliance body once recess 112 engages with attachment 106, or the like.

In some examples, spring member 104 is integral with at least one shell 110. Spring member 104 may include a region of appliance body 102 that may be deformed when spring member 104 engages with attachment 106. For example, spring member 104 may include the region indicated by the dashed lines in FIGS. 1A and 1C.

In other examples, spring member 104 includes a bendable flap (e.g., a cantilever beam) integrally formed with appliance body 102 to extend from a hinge axis. Generally, a respective bendable flap may extend from a respective hinge axis extending along any portion of a respective shell, in any direction. For example, the bendable flap may extend from a hinge axis near the occlusal portion of appliance body 102. Appliance body 102 may define a flap boundary region extending from a first terminal point on the hinge axis, round the bendable flap, to a second terminal point on the hinge axis. The flap boundary region may include an area of reduced shear and tensile stress compared to the surrounding portion of the appliance body 102, such as, for example, at least one of a cutout, a slit, a plurality of perforations, an elastomeric material, a material of low modulus, at least one arcuate displacement, and a thinner region of appliance body 102. The at least one arcuate displacement may include, for example, a spring bellows (e.g., a ribbon of material) extending around at least a portion of the flap boundary region 109C or at least one jumper (e.g., a rod of material) coupled to the shell and the bendable flap. The arcuate displacement may be made of the same material as the shell, and shape as at least one of an arcuate, sinusoidal, zig-zag, or other folded cross-section (in a plane perpendicular to both a plane tangential to the flap boundary region and the surface of the shell). The arcuate displacement may be formed integrally with shell 104C. By including a region of reduced shear and tensile stress, the flap boundary region may allow the bendable flap to deflect in the lingual-facial direction, cover at least a portion of the flap boundary region to reduce build-up of food particles or plaque in the flap boundary region or other portions of the appliance body 102, or both.

Spring member 104 may include a recess 112 to engage with attachment 106. Recess 112 may be positioned and shaped to receive at least a portion of attachment 106. For example, appliance body 102 includes a depression defining recess 112, recess 112 may extend into at least a portion of appliance body 102, recess 112 may extend substantially through appliance body 102, or the like. In examples in which recess 112 extends substantially through appliance body 102, appliance body 102 may include a spring member cover configured to at least partially extend over recess 112. The spring member cover may reduce build-up of food particle or plaque in recess 112. The spring member cover may include the same material as appliance body 102, or a different, preferably lower modulus material. A spring member cover including a lower modulus material may be configured to cover recess 112 extending substantially through appliance body 102 and easily deform when spring member 104 is deformed. Recess 112 may enable spring member 104 to engage with attachment 106.

Recess 112 may be positioned and shaped to follow the gingival margin of removable dental appliance 100. For example, recess 112 may be subject to a constant offset from the edge of removable dental appliance 100. In this way, appliance body 102 may define a band of material (e.g., a gingival portion of spring member 104) having both constant height and thickness. In some examples, the aspect ratio of a cross-section of the band may be reduced such that the height of the band is substantially equal to or less than the thickness of the band. The shape and position of the band may be selected to at least one of reduce torsion in the band as the band is deformed, improve the elasticity of the band in tension by reducing its cross-sectional area along its length, and improve elasticity of the band by following an arcuate or sinusoidal path of the gingival margins.

In examples in which spring member 104 include a bendable flap, the bendable flap may include recess 112 near an edge of the flap opposing the hinge axis (e.g., the free end of the bendable flap). For example, attachment 106 bonded near the gingival margin may include an undercut on the gingival side configured to engage with recess 112 near the free end of the bendable flap extending from a hinge axis near the occlusal portion of appliance body 102. The bendable flap may include at least a second hinge axis along a mid-section between the occlusal end and gingival end of the bendable flap. The second hinge axis may be parallel to the first hinge axis. The first hinge axis and the second hinge axis result in a wave- or zigzag-shaped configuration of the bendable flap in a rest position. For example, the first hinge axis may result in a facial displacement of the bendable flap in a rest position, whereas the second hinge axis may result in a lingual displacement of the bendable flap in a rest position. The bendable flap may be configured to straighten into a more planar configuration as the bendable flap is deformed to engage recess 112 with attachment 106. The gingival edge of the bendable flap may be slightly ramped or upturned, the occlusal edge of attachment 106 may be ramped, or both to reduce conflict as the gingival edge of the bendable flap travels over the occlusal edge of attachment 106 when the bendable flap is deformed to engage recess 112 with attachment 106. For example, in response to a force applied to the bendable flap (e.g., finger pressure toward the facial surface of the tooth in a facial-to-lingual direction), the bendable flap unfolds or flattens to extend in the gingival direction to align recess 112 with attachment 106, and additional force may serve to engage recess 112 with attachment 106. A fingernail or an auxiliary tool may be used to lift the bendable flap to disengage recess 112 from attachment 106.

As shown in FIGS. 1A and 1B, recess 112 may include a first dimension 114 extending substantially perpendicular to a direction of spring force 108 and a second dimension 116 extending substantially parallel to the direction of spring force 108. In some examples, the first dimension 114 may be greater than the second dimension 116. For example, recess 112 may be shaped as an elongated slot, oval, rectangle, or the like. In other examples, the first dimension 114 and the second dimension may be substantially similar. For example, recess 112 may be shaped as a circle, a square, or the like. Recess 112 may include other regular or irregular shapes. Recess 112 may contain features such as protrusions or notches which serve to prevent undesired movements (e.g. lateral drift) of attachment 106, tooth 101, or both in recess 112. In some examples, recess 112 may include at least one, such as two, stress concentration reduction features. For example, the ends of recess 112 may include stress concentration reduction circles. Stress concentration reduction features may reduce tearing or cracking of appliance body 102 when spring member 104 is deformed to engage with attachment 106.

In some examples, the shape and position of recess 112 relative to attachment 106 may affect the direction or magnitude of spring force 108. For example, recess 112 may be positioned farther from attachment 106 when appliance body 102 is in an undeformed state, such that spring member 104 applies a greater amount of force to attachment 106 when appliance body 102 is deformed to engage spring member 104 with attachment 106. As another example, first dimension 114 of recess 112 may be positioned substantially parallel to the occlusal plane of the teeth (e.g., as shown in FIGS. 1A and 1B). By positioning first dimension 114 substantially parallel to the occlusal plane of the teeth, spring member 104 may exert spring force 108 on attachment 106 substantially perpendicular to the occlusal plane to result in a substantially extrusive (or intrusive) force to tooth 101 when removable dental appliance 100 is worn by the patient, depending on whether spring member 104 is to the occlusal or gingival side of attachment 106 in the undeformed state. As an additional example, first dimension 114 of recess 112 may be positioned at an angle relative to the occlusal plane of the teeth to provide a force to attachment 106 that may result in at least one of a rotational, translational, extrusive, intrusive, tipping, and torqueing force on tooth 101.

In other examples, rather than recess 112, spring member 104 may include a protrusion extending outward from appliance body 102 toward a surface of tooth 101. The protrusion may be configured to engage attachment 106. For example, the protrusion may include a ledge shaped to engage attachment 106. The protrusion may be shaped, positioned, or include dimensions to control a direction, magnitude, or both, of force 108 applied to attachment 106 as described above with respect to recess 112.

In some examples, at least a portion of spring member 104 may be deformed when spring member 104 initially engages attachment 106. By deforming at least a portion of spring member 104, spring member 104 may apply spring force 108 to attachment 106 in response to the deformation, e.g., a restorative force in which the spring member is moving toward an undeformed configuration. For example, spring force 108 originates, at least in part, from the deformation (e.g., deflection) of spring member 104 that includes a band appliance body 102 extending between the edge of appliance body 102 and recess 112. The aspect ratio of spring member 104 may be high, for example, spring member 104 may be much taller (i.e., in the occluso-gingival direction) than it is wide (i.e., in the labio-lingual direction). Spring member 104 may be displaced from the occluso-gingival plane when spring member 104 deforms to engage with attachment 106. For example, in addition to bending in the occluso-gingival direction, spring member 104 may twist in the labio-lingual direction away from the tooth. In some examples, the occlusal edge of spring member 104 remains secured by an undercut on attachment 106. The edge of spring member 104 may rotate up to 90-degrees, or more, against attachment 106 as it twists. The twisting of spring member 104 may result in a force on attachment 106 that contributes, at least in part, to the resulting magnitude of spring force 108, direction of spring force 108, or both. Additionally, at least a portion of spring member 104 may be under tension. The tension in spring member 104 may result in a force on attachment 106 that contributes, at least in part, to the resulting magnitude of spring force 108, direction of spring force 108, or both. In this manner, spring member 104 may be configured to apply spring force 108, having a particular direction and magnitude, to attachment 106. Spring force 108 may result in any one or more of a corresponding rotation, translation, extrusion, intrusion, tipping, or torqueing of tooth 101. By applying force 108 via deformation of spring member 104, a respective shell adjacent to shell 110 may better engage the respective tooth compared to CTAs without spring member 104. In this manner, removable dental appliance 100 may decouple engagement of a respective tooth by a respective shell and the force applied to the respective tooth to improve control of force vector direction, magnitude, or both, to achieve a desired tooth movement over a shortened treatment time compared to CTAs without a spring member 104. Additionally, or alternatively, spring member 104 may be configured to apply a spring force to attachment 106 to cause movement(s) of tooth 101 that may be more difficult to achieve with aligner trays that do not include spring member 104, such as a rotation, an extrusion, an intrusion, or the like.

The geometry of appliance body 102 may be selected to facilitate engagement of spring member 104 with attachment 106. For example, appliance body 102 may include a positioning member. The positioning member may include at least one protrusion on appliance body 102, at least one recess in appliance body 102, at least one displacement of appliance body 102, or the like. In examples in which the positioning member includes a displacement of appliance body 102, the displacement may define a void between the occlusal surface of a tooth or teeth and a surface internal to appliance body 102 when the appliance body is initially fitted to the dental arch. The positioning member may facilitate deformation of the appliance body in response to a force applied to the displacement. For example, the force may be applied to at least a portion of the positioning member by a tool, finger, or occlusal surface of an opposing dental arch. The force, and resulting deformation of appliance body 102, may cause spring member 108 (e.g., recess 112) to engage with attachment 106. By facilitating engagement of spring member 104 with attachment 106 via the positioning member, removable dental appliance 100 may increase patient compliance compared to other orthodontic treatments, and improve control of force vector direction, magnitude, or both, to achieve a desired movement of tooth 101 over a shortened treatment time compared to other orthodontic appliances.

Appliance body 102 may include a polymeric material, such as, for example, any one or more suitable polymers. Suitable polymers may include, but are not limited to, (meth)acrylate polymer; epoxy; silicones; polyesters; polyurethanes; polycarbonate; thiol-ene polymers; acrylate polymers such as urethane (meth)acrylate polymers, polyalkylene oxide di(meth)acrylate, alkane diol di(meth)acrylate, aliphatic (meth)acrylates, silicone (meth)acrylate; polyethylene terephthalate based polymers such as polyethylene terephthalate glycol (PETG) polypropylene; ethylene-vinyl acetate; or the like. In some examples, appliance body 102 may include a unitary polymeric material that forms at least one shell 110, spring member 104, and a positioning member of appliance body 102. For example, removable dental appliance 100 may include a single, continuous polymeric material. In other examples, appliance body 102 may include a multi-layer material. The multi-layer material may include multiple layers of a single material, e.g., a single polymer, or multiple layers of a plurality of materials, e.g., two or more polymers, a polymer and another material. Multi-layer materials may enable one or more portions of appliance body 102 to be formed with a plurality of layers having different elastic modulus to enable selection of force characteristics of spring member 104.

Appliance body 102 may be formed into a desired shape using any suitable technique. In some examples, appliance body 102 may be formed into the shape of the desired position of teeth of a patient using a thermoforming mold process. For example, a mold plug or positive model of at least a portion of the patient's dental anatomy may be formed using suitable techniques, such as by 3D printing, milling, pouring a casting of an impression, or setting segmented teeth in wax where the position of the teeth is set to a next incremental position. The mold plug or positive model may include an analog of attachment 106 that results in a depression being formed in the appliance body 102, a guide being formed in the appliance body 102, or the like. For example, the analog may reproduce at least one of the features of attachment 106, may be offset or scaled from the actual surface of attachment 106 to leave space in the tray for receiving the actual attachment once the tray is placed on the teeth of the patient, may add or omit features (e.g., undercuts), or the like. As another example, the analog may result in a guide that may be used to manually or automatically cut or etch recess 112 into appliance body 102. A sheet of the material used to form appliance body 102 may be heated to (or above) its glass transition temperature, draped over the dental model, and subjected to an air pressure differential, such that a higher pressure is applied to the outer surface of the sheet than the inner surface adjacent to the model. The pressure differential causes the sheet to conform to the surface of the dental model, and the shape is retained by maintaining the pressure differential until the sheet cools below its glass transition temperature. During or after cooling, appliance body 102 may be manually or automatically trimmed (e.g., by CNC milling, LASER machining, or the like) to form at least one of at least one recess 112 and at least one spring member 104.

In other examples, three-dimensional (3D) printing or additive manufacturing may be used to form appliance body 102. For example, a digital 3D representation of the teeth of a patient may be produced using, for example, an intraoral scanner. Appliance body 102 then may be directly produced based on the digital representation of the teeth using a 3D printer. The 3D printing process may produce a textured surface marked by contour lines or "stair steps" (also known as aliasing effects), which may be less desirable in oral applications due to poor sensory feel. Due to aliasing, appliance body 102 formed by 3D printing may scatter light and reduce clarity of the polymeric material, allow biofilm formation or staining, and increase friction or interference with opposing surfaces in the dentition. Additionally, some 3D printing polymers may degrade in the oral environment. To reduce these effects, appliance body 102 formed by 3D printing may be post processed in a variety of ways to affect the surface topography of the body including coating with one or more coatings. For example, a removable dental appliance may be coated with a water-resistance polymer as described in U.S. Patent Application No. 62/536,719 by Parkar et al., titled WATER-RESISTANT POLYMER-BASED DENTAL ARTICLES, the contents of which are incorporated by reference in its entirety.

The thickness of removable dental appliance 100 may be between about 0.10 millimeters and about 2.0 millimeters, such as between about 0.2 and about 1.0 millimeters, or between about 0.3 and about 0.75 millimeters. In some examples, thicknesses of appliance body 102 including features of removable dental appliance 100, including, but not limited to, spring member 104, shell 110, relief 111, or recess 112, may be varied to achieve more tailored forces. For example, thickness of appliance body 102 may increase near or in spring member 104. Increasing the thickness near spring member 104 may increase the amount of force that spring member 104 may apply to attachment 106 for a given length of deformation required for spring member 104 to engage with attachment 106. Similarly, thickness of appliance body 102 may decrease near or in spring member 104. CNC milling or LASER machining may be used to selectively reduce the thickness of appliance body 102. For example, CNC milling or LASER machining may remove at least a selected thickness of material from selected locations on appliance body 102 to improve flexibility, reduce resistance to shear stress, or the like. Decreasing the thickness near spring member 104 may decrease the amount of force that spring member 104 may apply to attachment 106 for a given length of deformation required for spring member 104 to engage with attachment 106. In the same or different examples, removable dental appliance 100 may include chamfers or fillets on edges of recess 112 and other spaces. Such chamfers or fillets may improve patient comfort, reduce the visibility of removable dental appliance 100, reinforce selected location of appliance body 102 to reduce tearing or cracking of appliance body 102, or the like.

In some examples, removable dental appliance 100 may include a metallic component configured to enhance forces applied by removable dental appliance 100 to one or more of the surrounded teeth. For example, the metallic component may comprise a wire or ribbon extending through at least a portion of spring member 104, such as, for example, adjacent one or more surfaces of recess 112. The metallic or ceramic component may include a metal or ceramic cap molded into or bonded to a portion of appliance body 102 (e.g., recess 112). The metal or ceramic cap may be shaped to receive and engage attachment 106. The metal or ceramic cap may result in improved purchase, stress relief, control over the orientation of spring member 104 as spring member 104 is deformed, or the like. In some examples, the metal or ceramic cap may be temporarily positioned on a printed model of the patient's dental anatomy and transferred to appliance body 102 during thermoforming. In some examples, removable dental appliance 100 may include one or more other metal components, such as metal occlusal components, where greater durability is needed to overcome the stress of high-pressure occlusal contact, such as bruxing, or mastication. In some locations the added features may be comprised of ceramic which is strong and yet aesthetically similar to tooth structure. In some examples, removable dental appliance 100 may include catches to connect to an anchorage device implanted within the patient, e.g., a temporary anchorage device or mini-screw. In this manner, such removable dental appliances 100 may provide a hybrid construction of metal, ceramic, or plastic.

Attachment 106 may include any suitable biocompatible material, such as, biocompatible metals, ceramics, dental restorative, orthodontic adhesives, or the like. Biocompatible metals may include, for example, stainless steel, titanium, nickel titanium, molybdenum, rhodium, or the like. ceramics may include, for example, alumina, zirconia, porcelain, or the like. Attachment 106 may be configured to affix to tooth 101 using any suitable technique. For example, attachment 106 may be affixed to tooth 101 with a dental cement or a dental adhesive using direct or indirect placement approaches.

While plastic components may be generally clear for reduced visibility, metal components may include plating or other coloring to reduce visibility of the removable dental appliance when worn by the patient. For example, metal components positioned near the teeth of a patient when implanted may include white coloring, whereas metal components positioned elsewhere may be colored to generally match tissue color within the mouth of the patient.

Figure 2A:
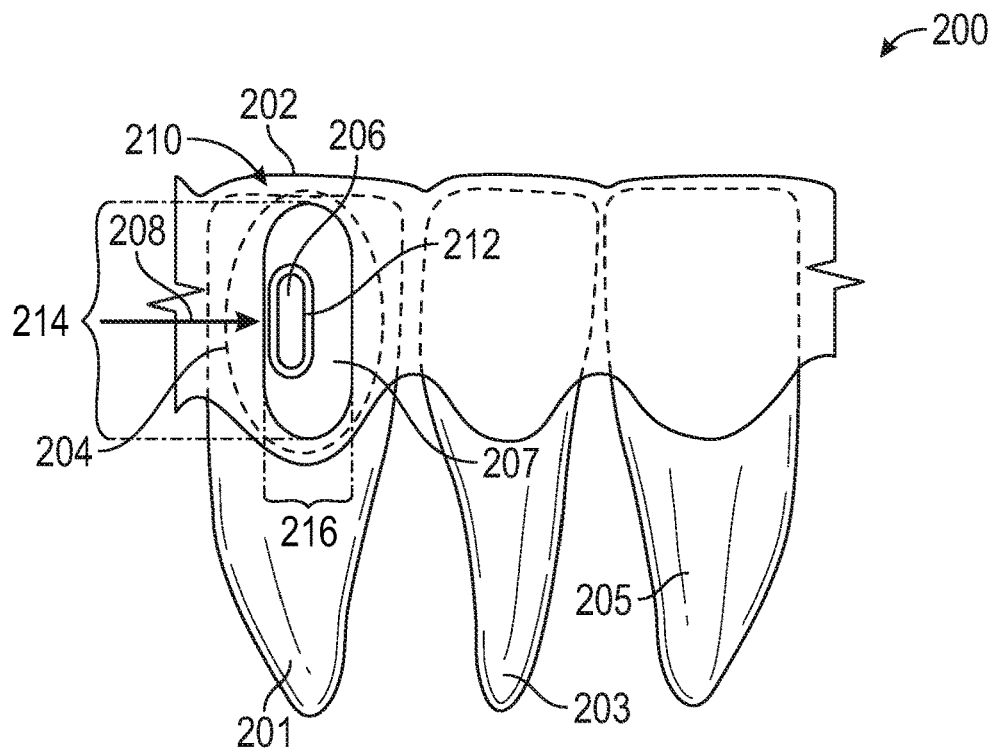
FIGS. 2A-2D illustrate facial views of an example removable dental appliance that includes a shell and a spring member to engage an attachment to facilitate a movement of a tooth of a patient.
Figure 2B:
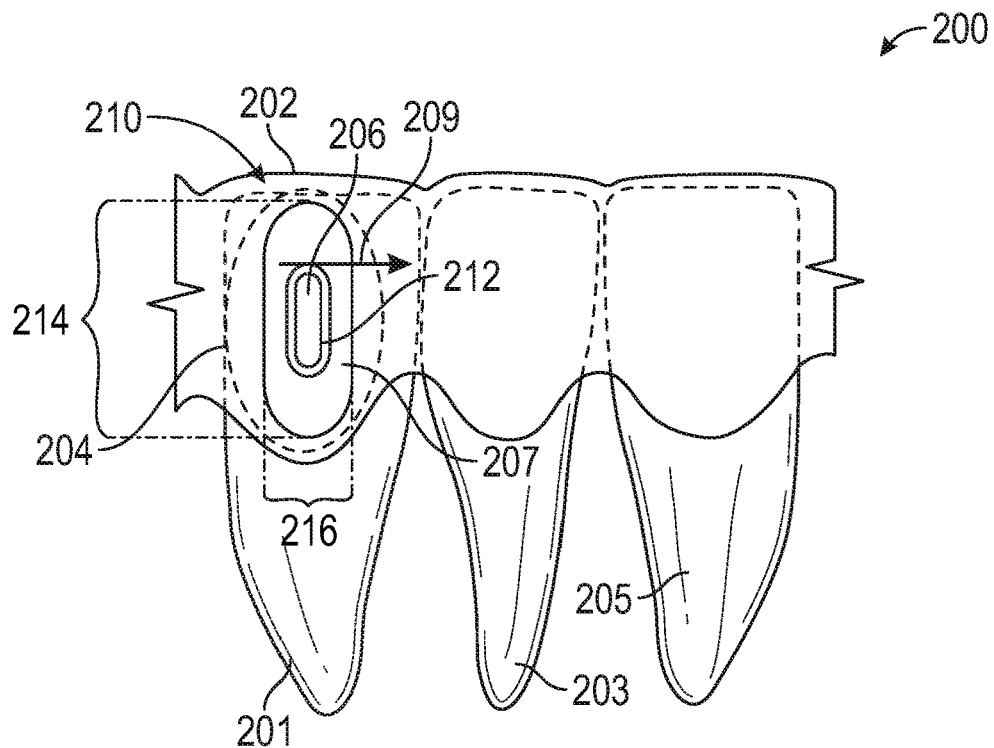
Figure 2C:
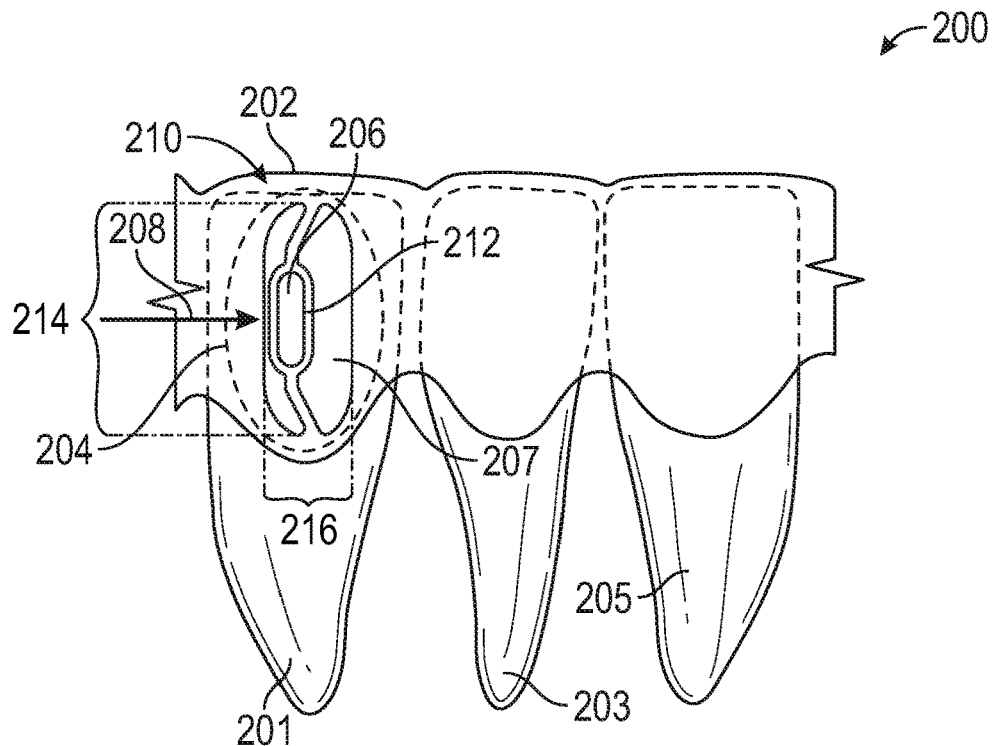
Figure 2D:
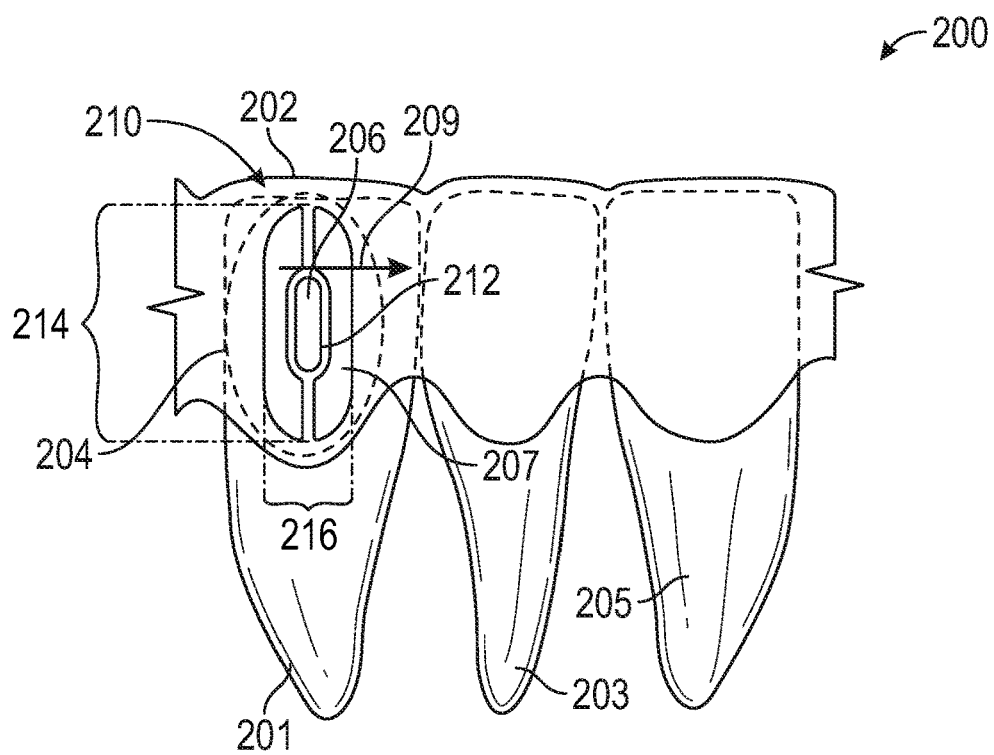

Although FIGS. 1A-1D illustrate a spring member 104 that includes linear recess or slot, the shape of spring member 104, including, for example, a recess or slot may be selected to achieve a desired force vector, including direction and magnitude. FIGS. 2A-6C illustrate examples of other spring members with different shapes, orientations, or both. FIGS. 2A-2D illustrate facial views of a portion of an example removable dental appliance 200 that includes a spring member 204 engaged with an attachment 206 on a tooth 201 of a patient. FIG. 2A illustrates removable dental appliance 200 surrounding three anterior teeth 201, 203, and 205 in an initial position, e.g., a maloccluded position, in which spring member 204 is engaged with attachment 206. FIG. 2B shows removable dental appliance 200 surrounding three anterior teeth 201, 203, and 205 in a desired position, e.g., a final position after orthodontic treatment or an intermediate position achieved by use of removable dental appliance 200, in which spring member 204 is engaged with attachment 206. FIG. 2C illustrates removable dental appliance 200 surrounding three anterior teeth 201, 203, and 205 in an initial position, e.g., a maloccluded position, in which spring member 204 is engaged with attachment 206. FIG. 2D shows removable dental appliance 200 surrounding three anterior teeth 201, 203, and 205 in a desired position, e.g., a final position after orthodontic treatment or an intermediate position achieved by use of removable dental appliance 200, in which spring member 204 is engaged with attachment 206.

Removable dental appliance 200 may be the same or similar to removable dental appliance 100 of FIGS. 1A-1D, aside from spring member 204. For example, spring member 204 defines a first dimension 214 that is substantially perpendicular to the occlusal plane of the dental arch on which removable dental appliance 200 is worn and a second dimension 216. First dimension 214 is greater than second dimension 216. Additionally, spring member 204 includes a collar region 207. In other examples, spring member 207 may not include collar region 207. Like removable dental appliance 100, removable dental appliance 200 may include an appliance body 202 configured to surround teeth 201, 203, and 205. Appliance body 202 defines shell 210. Appliance body 202 also defines spring member 204, which includes a recess 212. Recess 212 may be configured to engage attachment 206. Recess 212 may include first dimension 214 substantially perpendicular to spring force 208 and second dimension 216 substantially parallel to spring force 208. Attachment 206 may be affixed to tooth 201.

Recess collar 207 may facilitate engagement of spring member 204 with attachment 206. In some examples, as shown in FIGS. 2A and 2B, collar region 207 may include a region of material having greater flexibility than the surrounding appliance body 202. For example, collar region 207 may include an area of reduced thickness of appliance body 202, an area of lower modulus material than the surrounding material of appliance body 202, or the like. In other examples, as shown in FIGS. 2C and 2D, collar region may include at least one, such as two, voids, such as, e.g., cutouts, perforations, or the like. The voids may reduce resistance to shear and other forces to effectively increase the flexibility of recess 212. The greater flexibility of collar region 207 may allow a positioning force to be applied to collar region 207 to engage recess 212 with attachment 206 without substantially deforming other portions of appliance body 202. For example, as seen in FIGS. 2A and 2C, collar region 207 may deform in response to a positioning force to move recess 212 in the mesial-distal direction to align recess 212 with attachment 206. Generally, collar region 207 may be deformed in any other direction.

When recess 212 engages with attachment 206 and the positioning force is relaxed, the deformation of collar region 207 may result in a spring force 208. Spring force 208 may include a restorative force in which collar region 207 may move toward an undeformed configuration. Spring force 208 may be transferred to tooth 201 via attachment 206. For example, as seen in FIG. 2B, spring force 208 may result in translation 209 of tooth 201 in the mesial-distal direction toward tooth 203. In examples in which collar region is deformed in other directions, other tooth movements may result, such as, for example, at least one of a rotation, an extrusion, an intrusion, a tipping, and a torqueing. Translation 209 may continue until spring force 208 is no longer sufficient to cause alveolar bone remodeling, for example, when a portion of tooth 201 contacts a portion of tooth 203. In this way, collar region 207 may be configured to move tooth 201.

Although spring member 214 is illustrated as being oriented to cause movement of tooth 201 in a mesial-distal direction due to the relative dimensions of spring member 214 and the relative position of spring member 214 and recess 212 relative to attachment 206 when spring member 214 is in an undeformed state, in other examples, the configuration of spring member 214 and attachment 206 may be different, and may cause one or more spring forces in one or more different directions.

Figure 3A:
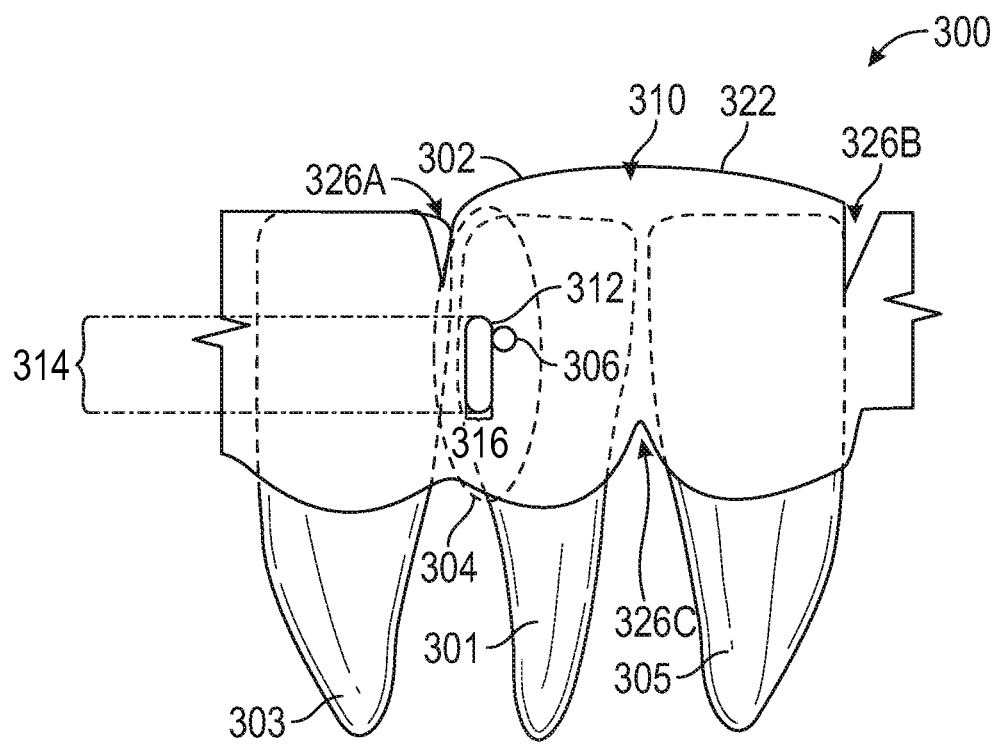
FIGS. 3A, 3B, and 3C illustrate facial views of an example removable dental appliance that includes a shell, a spring member engaged with an attachment, and a positioning member to facilitate a movement of a tooth of a patient.
Figure 3B:
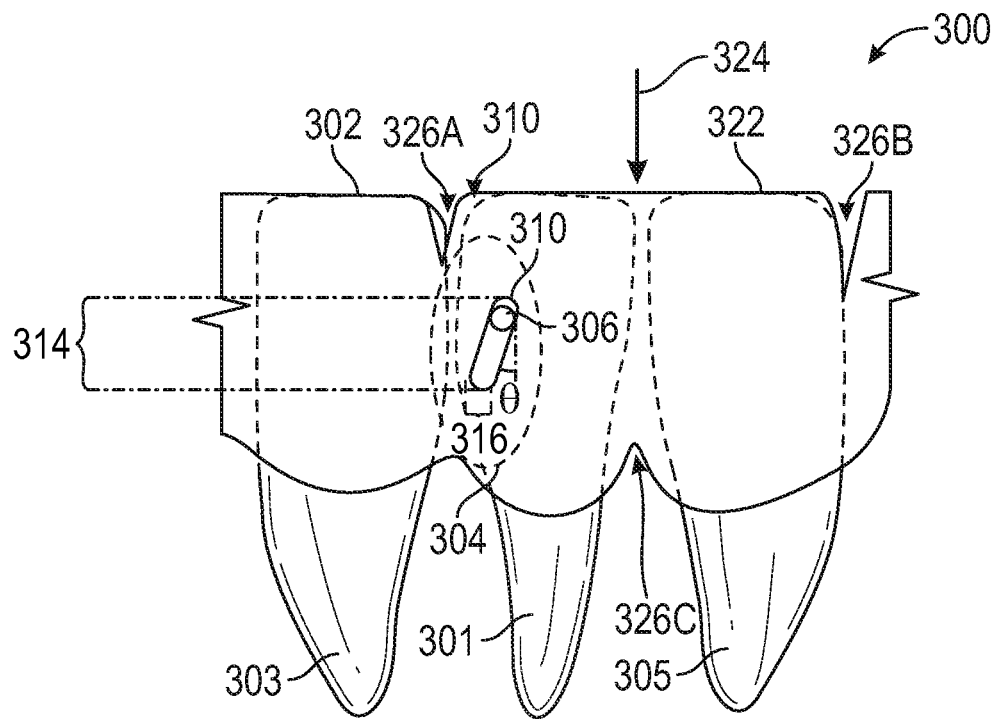
Figure 3C:
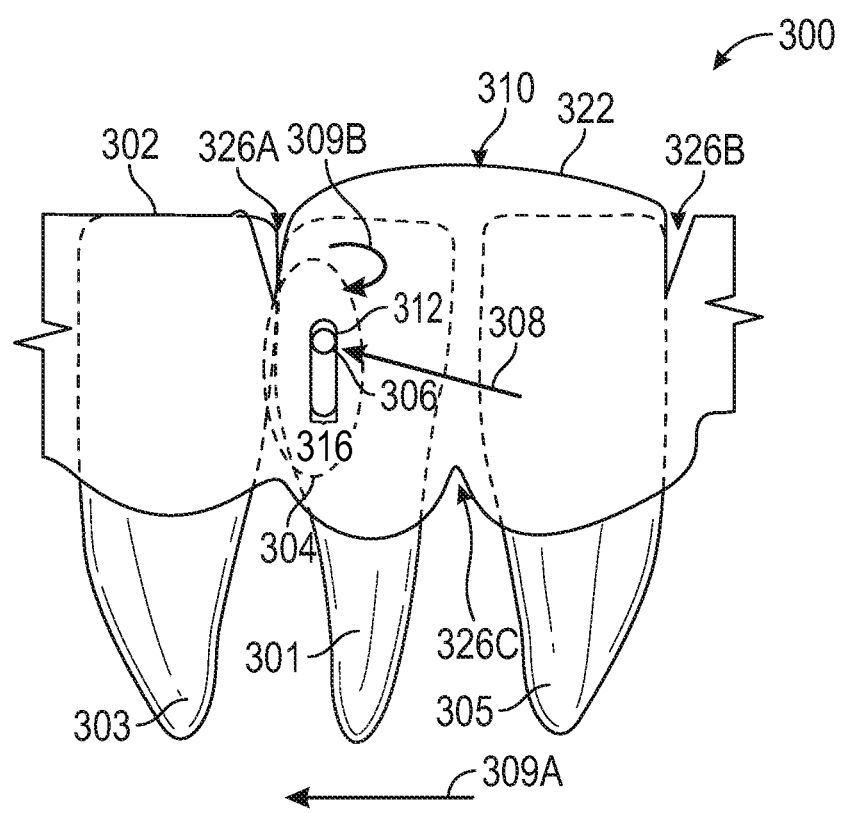

For example, a spring member may be oriented and positioned relative to an attachment to cause one or more of a tipping force, a torqueing or rotational force, an extrusion force, an intrusion force, or the like. FIGS. 3A, 3B, and 3C illustrate facial views of an example removable dental appliance 300 that includes a positioning member 322 and flexural regions 326A, 326B, and 326C (collectively, "flexural regions 326") to facilitate engagement of a spring member 304 with an attachment 306 affixed to a tooth 301. Spring member 304 and attachment 306 may be configured to cause at least a rotational force and a translational force to be applied to tooth 301. FIG. 3A illustrates a facial view of a portion of removable dental appliance 300 surrounding teeth 301, 303, and 305 in an initial position, e.g., a maloccluded position, in which spring member 304 is not engaged with attachment 306. FIG. 3B illustrates a facial view of a portion of removable dental appliance 300 surrounding teeth 301, 303, and 305 in an initial position, in which spring member 304 is engaged with attachment 306. FIG. 3C illustrates a facial view of a portion of removable dental appliance 300 surrounding three anterior teeth 301, 303, and 305 in a desired position, e.g., a final position after orthodontic treatment or an intermediate position achieved by use of removable dental appliance 300, in which spring member 304 is engaged with attachment 306.

Removable dental appliance 300 may be the same as or substantially similar to removable dental appliance 100 of FIGS. 1A-1D, aside from the differences described herein. For example, recess 312 may have a different orientation and position relative to attachment 306, and removable dental appliance 300 may include positioning member 322 and flexural regions 326. Like removable dental appliance 100, removable dental appliance 300 may include an appliance body 302 configured to surround at least teeth 301, 303, and 305. Appliance body 302 may define a shell 310. Appliance body 302 also may define spring member 304 having recess 312. Recess 312 may be configured to engage attachment 306. Recess 312 may include a first dimension 314 substantially perpendicular to a spring force 308 and a second dimension 316 substantially parallel to spring force 308. Attachment 306 may be affixed to tooth 301.

Positioning member 322 may be configured to facilitate the engagement of spring member 304 with attachment 306 in response to a positioning force 324 being applied to positioning member 322. For example, at least a portion of appliance body 302 or spring member 304 may deform when positioning force 324 is applied to positioning member 322. The deformation of appliance body 302 or spring member 304 may facilitate the engagement of spring member 304 with attachment 306. For example, positioning member 322 may be positioned on appliance body 302 relative to spring member 304 such that when positioning force 324 is applied to positioning member 322 at least a portion of appliance body 302 or spring member 304 deforms to enable spring member 304 to engage with attachment 306 (e.g., as discussed above with respect to FIGS. 1A-1D). As seen in FIG. 3A, positioning member 322 may include a deflection of appliance body 302 away from an occlusal surface of a dental arch on which removable dental appliance 300 is worn, such that, in a non-deformed position, a cavity or open space exists between shell 310 and the occlusal surface of the dental arch. For example, positioning member 322 may include a deflection away from tooth 301 configured to receive positioning force 324 for an occlusal surface of a second, opposing dental arch, a finger (e.g., a finger of a patient or a clinician), or the like. In other examples, positioning member 322 may be defined in appliance body 302 by other features such as a protrusion from appliance body 302 configured to receive positioning force 324 for an occlusal surface of a second, opposing dental arch, a finger (e.g., a finger of patient or a clinician), or the like. In still other examples, positioning member 322 may include an aperture shaped to receive a positioning force applied by a tool (e.g., an explorer, a scaler, or similar hook-shaped tool), by a finger (e.g., a finger of patient or a clinician), or the like.

In some examples, in addition to positioning member 322, appliance body 302 may define at least one flexural region 326. At least one flexural region 326 may be configured to facilitate deformation of appliance body 302 when positioning force 324 is applied to positioning member 322. For example, application of positioning force 324 to positioning member 322 may result in tension, compression, or shear forces in appliance body 302 near the gingival margin or occlusal plane within shell 310 or between shell 310 and an adjacent shell. At least one flexural regions 326 may reduce this tension, compression, or shear force. For example, flexural regions 326 may include a fold in appliance body 302 such that appliance body 302 may expand under the tension. In other examples, as shown in FIGS. 3A-3C, at least one flexural region 326 may be a cutout(s) in appliance body 302. In examples in which at least one flexural region 326 includes at least one cutout, the tension, compression, or shear may be effectively eliminated in the location of the cutout. By including at least one flexural region 326, removable dental appliance 302 may reduce tension or shear forces in the gingival margin or occlusal plane of appliance body 302 when positioning force 324 is applied to positioning member 322.

As shown in FIG. 3B, positioning member 322 may be positioned over spring member 304 such that when positioning force 324 is applied to positioning member 322, appliance body 302 deforms to position recess 312 of spring member 304 over attachment 306. For example, recess 312 may be positioned mesial or distal relative to attachment 306 in an undeformed state in which recess 312 is not engaged with attachment 306. First dimension 314 of recess 312 may be substantially perpendicular relative to the occlusal surface of tooth 301 when recess 312 is not engaged with attachment 306. As seen in FIG. 3B, when positioning force 324 is applied to positioning member 322, spring member 304 may deform to align recess 312 with attachment 306, which may allow recess 312 to engage attachment 306.

In some examples, removable dental appliance 300 may be configured to facilitate engagement of spring member 304 with attachment 306 in response to positioning force 324 applied to positioning member 322 by an occlusal surface of an opposing dental arch of the patient, e.g., the positioning force 324 may be a bite force. By enabling bite force positioning, removable dental appliance 300 may improve patient compliance with an orthodontic treatment compared to other orthodontic appliances without bite force positioning. In other examples, positioning force 324 may be applied by a tool or a finger of the patient. In this way, positioning member 322 may facilitate engagement of spring member 304 with attachment 306.

When positioning force 324 is relaxed, the deformation of spring member 304 may result in spring force 308 on attachment 306. The orientation of at least one of spring member 304, attachment 306, recess 312, and positioning member 322 may affect the direction and magnitude of the spring force 308. The direction and magnitude of spring force 308 may affect the resulting movements 309A and 309B (collectively, "movements 309") of tooth 301. For example, as shown in FIG. 3C, positioning member 322 may be positioned offset from spring member 304 such that when positioning force 324 is applied to positioning member 322, spring member 304 may deform to position recess 312 over attachment 306 at an angle Θ relative to an axis perpendicular to the occlusal surface of tooth 301. When positioning force 324 is relaxed, deformation of spring member 304 may result in spring force 308 on attachment 306. The orientation of spring member 304, such as the angle Θ of recess 312, may affect the direction of the spring force 308 and the resulting movements 309 of tooth 301. For example, the direction of spring force 308 may result in both movement 309A (e.g., a translation of tooth 301) and movement 309B (e.g., a rotation of tooth 301). In some examples, as discussed above with respect removable dental appliance 100, movement 309A, movement 309B, or both may be constrained by a surface of shell 310 that defines a void internal to shells 310. For example, the surface may guide tooth 301 along a predetermined path of rotation or translation. By selecting the relative position of spring member 304, attachment 306, recess 312, and positioning member 322, removable dental appliance 300 may control a direction of force applied to tooth 301 when removable appliance 300 is worn by the patient.

Figure 4B:
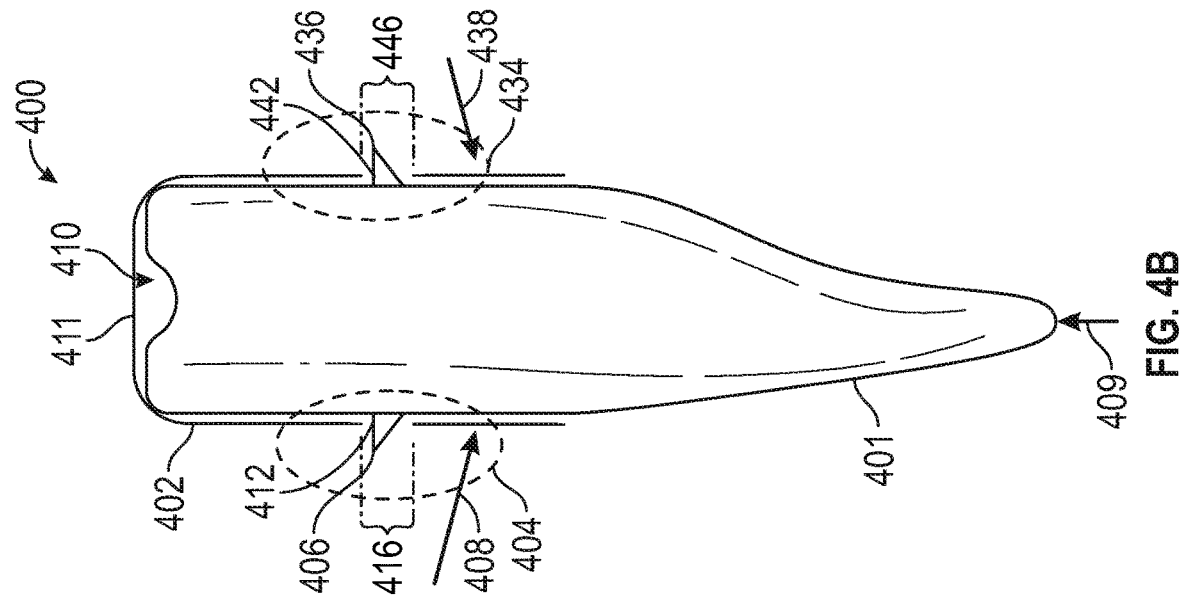
FIGS. 4A and 4B illustrate a cross-sectional view of an example removable dental appliance that includes a shell and a spring member engaged with ramped attachments to facilitate a movement of a tooth of a patient.
Figure 4A:
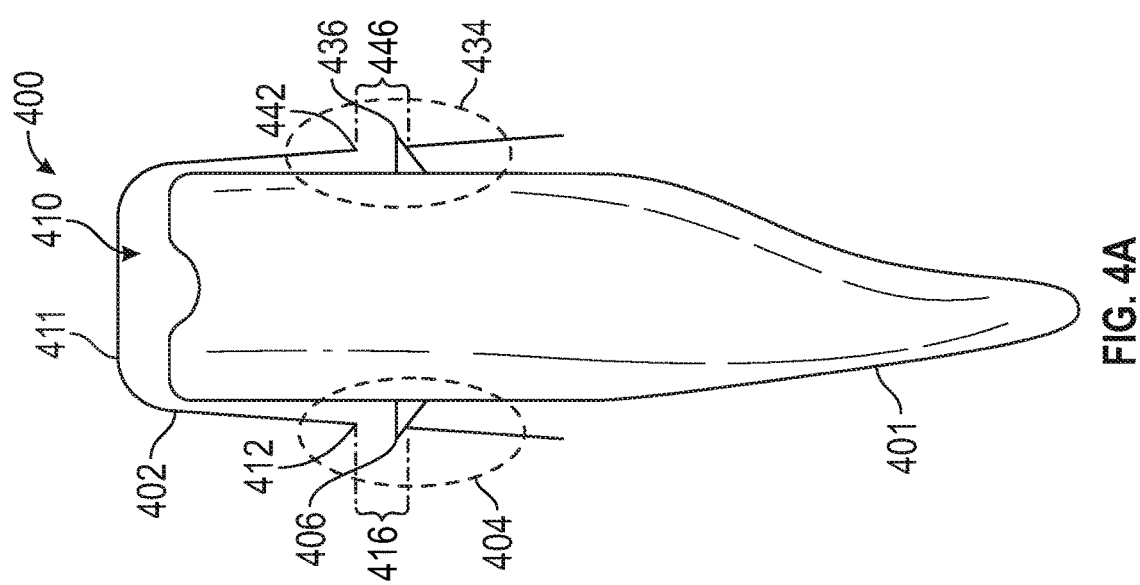

In some examples, a removable dental appliance may include more than one respective spring member integrally formed with a respective shell. For example, two spring members may be integrally formed with a respective shell to receive a respective attachment affixed to opposing sides of a respective tooth. FIGS. 4A, and 4B illustrate a cross-sectional view of an example removable dental appliance 400 that includes spring members 404 and 434 engaged with ramped attachments 406 and 436 on a tooth 401 of a patient. FIG. 4A illustrates a cross-sectional view of a portion of removable dental appliance 400 surrounding tooth 401 in an initial position, e.g., a malocculded position, in which spring members 404 and 434 are engaged with ramped attachments 406 and 436. FIG. 4B illustrates a cross-sectional view of a portion of removable dental appliance 400 surrounding tooth 401 in a desired position, e.g., a final position after orthodontic treatment or an intermediate position achieved by use of removable dental appliance 400, in which spring members 404 and 434 are engaged with ramped attachments 406 and 436.

Removable dental appliance 400 may be the same as or substantially similar to removable dental appliance 100 of FIGS. 1A-1D, aside from the addition of second spring member 434 on an opposing surface of appliance body 402 and ramped attachments 406 and 436. For example, removable dental appliance 400 may include an appliance body 402. Appliance body 402 may include a shell 410. Shell 410 may include a surface 411 defining a void internal to shell 410 and shaped to receive tooth 401. Appliance body 402 may define a first spring member 404 having a recess 412 and a second spring member 434 having a recess 442. Recesses 412 and 442 may be configured to engage ramped attachments 406 and 436. Recesses 412 and 442 may include second dimensions 416 and 446, respectively. Attachment 406 may be affixed to a first surface of tooth 401 (e.g., a vestibular surface) and attachment 436 may be affixed to a second, opposing surface of tooth 401 (e.g., a lingual surface).

As shown in FIG. 4A, first and second spring members 404 and 434 may engage with ramped attachments 406 and 436, respectively. Engagement of first and second spring members 404 and 434 with ramped attachments 406 and 436 may result in a deformation of shell 410 in the vestibular-lingual direction. For example, the portion of appliance body 402 nearest the gingiva may flare outward, away from tooth 401. In response to the deformation, spring members 404 and 434 may apply first and second spring forces 408 and 438 as shell 410 moves toward an undeformed configuration. The first and second spring force 408 and 438 may result in extrusion 409 of tooth 401 as first and second recesses 406 and 436 travel along first and second ramped attachments 406 and 436 as shell 410 move toward the undeformed configuration. Extrusion 409 of tooth 401 may continue to until first and second spring forces 408 and 438 are insufficient to result in alveolar bone remodeling. For example, extrusion 409 of tooth 401 may continue until an occlusal surface of tooth 401 contacts a portion of surface 411.

Selecting a shape of first and second ramped attachments 406 and 436 may control a magnitude or length of expression of first and second spring forces 408 and 438, and may control tooth movement 409. The size of first and second ramped attachments 406 and 436 may affect the magnitude of the first and second spring forces 408 and 438. For example, increasing the size (e.g., a vestibular-lingual dimension) of first ramped attachment 406, second ramped attachments 436, or both may cause greater deformation in shell 410 and result in a larger magnitude of the first and second spring forces 408 and 438. Conversely, smaller first and second ramped attachments 406 and 436 may cause lesser deformation in shell 410 and result in a smaller magnitude of the first and second spring forces 408 and 438. Similarly, ramped attachment 406 having a more acute angle relative to a plane perpendicular to the surface of tooth 401 may reduce friction between ramped attachment 406 and spring member 404 to transfer more spring force 408 to tooth 401. However, ramped attachment 406 having a more acute angle may reduce the total length of expression of the force, e.g., a more acute ramp shape may not move tooth 401 as far compared to a more obtuse ramp shape. By selecting a shape of ramped attachments 406 and 436, removable dental appliance 400 may control the magnitude and length of expression of first and second spring forces 408 and 438.

Selecting an orientation of first and second ramped attachments 406 and 436 may control a direction of first and second spring forces 408 and 438, and may control tooth movement 409. For example, orienting the ramped face of both first and second ramped attachments 406 and 436 toward the occlusal surface of tooth 401 may result in an intrusion. As another example, orienting the ramped face of both first and second ramped attachments 406 and 436 toward a mesial or distal direction relative to tooth 401 may result in a translation or tipping. As another example, orienting the ramped face of first ramped attachment 406 toward a mesial direction relative to tooth 401 and second ramped attachment 436 toward a distal direction relative to tooth 401 may result in a rotation or torqueing. In other examples, a single ramped attachment may be used. For example, a single ramped attachment may be used to result in at least one of a rotation, tipping, or translation. By selecting the number of ramped attachments 406 and 436, an orientation of one or more ramped attachments 406 and 436, a position of engagement of one or more ramped attachments 406 and 436 with respective spring members 404 and 434, and a shape of surface 411 of shell 410, removable dental appliance 400 may be configured to control a direction of a force applied to tooth 401.

Figure 5A:
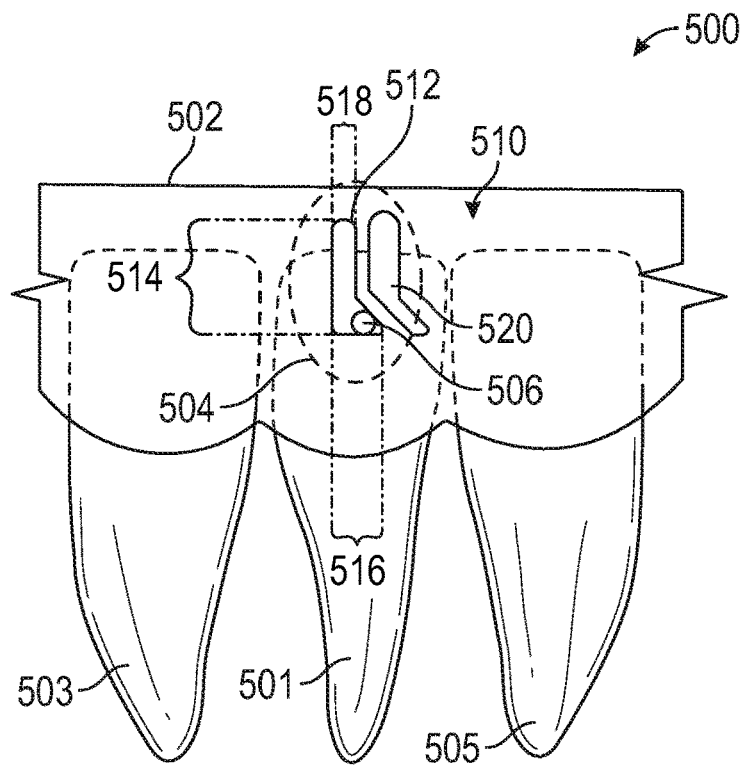
FIGS. 5A, 5B, and 5C illustrate facial views of an example removable dental appliance that includes a shell and a spring member with two recesses configured to facilitate engagement with an attachment and movement of a tooth of a patient.
Figure 5B:
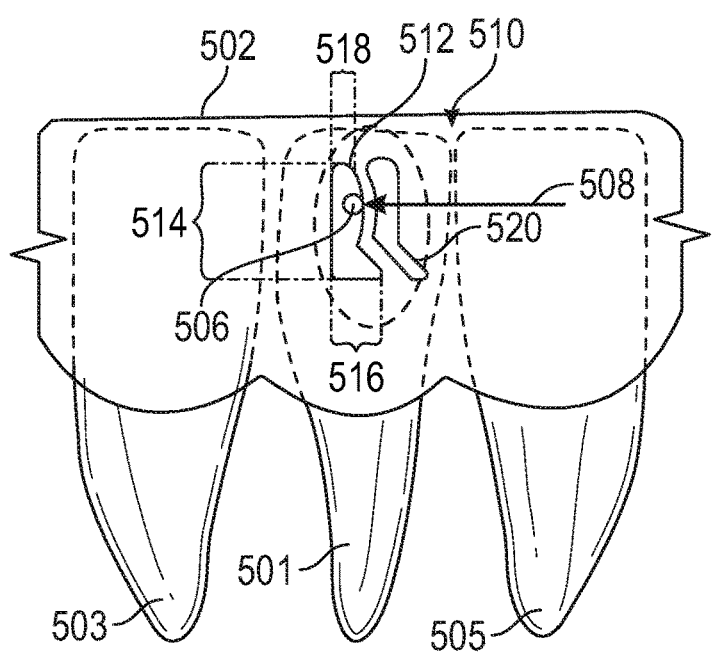
Figure 5C:
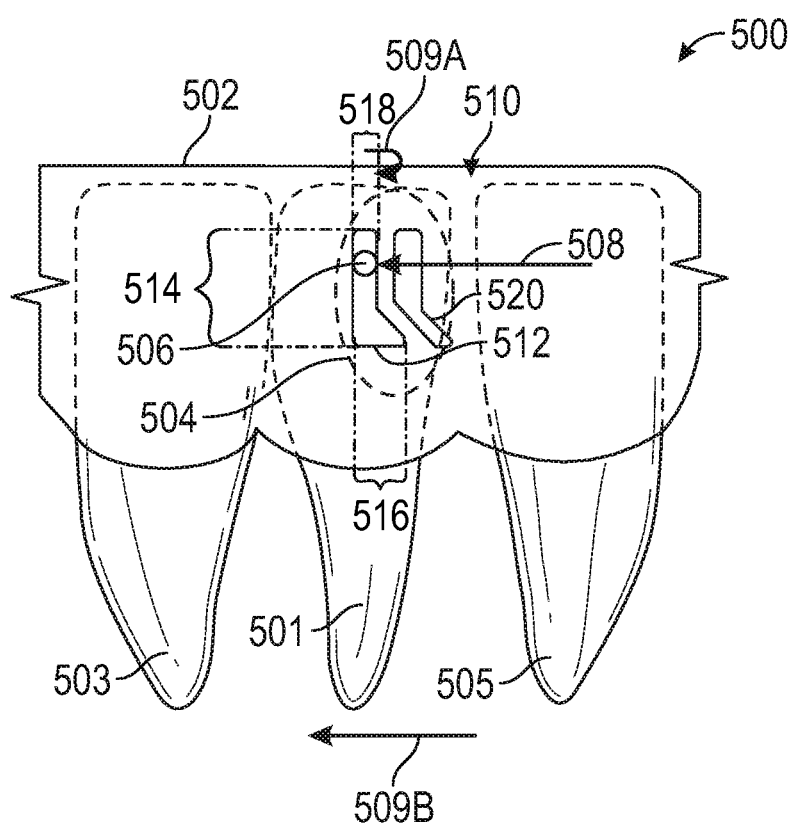

In some examples, a spring member may include more than one recess, a recess with a non-linear shape, or both, which may facilitate engagement of the spring member with an attachment and may allow further control of forces applied to a tooth. FIGS. 5A, 5B, and 5C illustrate facial views of an example removable dental appliance 500 that includes first and second recesses 512 and 520 defining non-linear shapes to facilitate engagement of a spring member 504 with an attachment 506 affixed to a tooth 501 of a patient. FIG. 5A illustrates a facial view of a portion of removable dental appliance 500 surrounding teeth 501, 503, and 505 in an initial position, e.g., a maloccluded position, in which spring member 504 is not engaged with attachment 506. FIG. 5B illustrates a facial view of a portion of removable dental appliance 500 surrounding teeth 501, 503, and 505 in an initial position, where spring member 504 is engaged with attachment 506. FIG. 5C illustrates a facial view of a portion of removable dental appliance 500 surrounding teeth 501, 503, and 505 in a desired position, e.g., a final position after orthodontic treatment or an intermediate position achieved by use of removable dental appliance 500, where spring member 504 is engaged with attachment 506.

Removable dental appliance 500 may be the same as or substantially similar to removable dental appliance 100 of FIGS. 1A-1D, aside from the differences described herein. For example, removable dental appliance 500 may include first and second recesses 512 and 520 that define non-linear shapes to facilitate engagement of spring member 504 with attachment 506 and further control force 508 applied to tooth 501. Like removable dental appliance 100, removable dental appliance 500 may include an appliance body 502 configured to surround at least teeth 501, 503, and 505. Appliance body 502 may define a shell 510. Appliance body 502 also may define a spring member 504 having a recess 512. Recess 512 may be configured to engage an attachment 506 affixed to tooth 501. Recess 512 may include a first dimension 514 substantially perpendicular to a spring force 508 and a second dimension 516 substantially parallel to spring force 508.

As shown in FIG. 5A, removable dental appliance 500 includes second recess 520. Second recess 520 may be similar to first recess 512. For example, recess 520 may extend into at least a portion of appliance body 502 or may extend substantially through appliance body 502. By extending into at least a portion of appliance body 502, recess 520 may increase the flexibility of at least a portion of first recess 512. For instance, as seen in FIG. 5B, a lack of material or reduced amount of material in recess 520 may reduce compression, strain, or tension that may otherwise be present in the material of spring member 504 as spring member 504 deforms when first recess is engaged with attachment 506. By reducing compression, strain, or tension in spring member 504, second recess may facilitate engagement of first recess 512 with attachment 506.

In some examples, as seen in FIG. 5A, first recess 512 may be shaped to facilitate engagement of spring member 504 with attachment 506 in response to removable dental appliance 500 being positioned on teeth 501, 503, and 505. As one example, a portion of first recess 512 near a gingival portion of appliance body 502 may be configured to engage attachment 506 with spring member 504 in an undeformed state. For example, second dimension 516 of first recess 512 may be greater than at least a width of attachment 506 and a desired deflection of spring member 504. In this way, as shown in FIG. 5A, a portion of first recess 512 may accept attachment 506 when removable dental appliance 500 is at least partially fitted to teeth 501, 503, and 505. A second portion of first recess 512 near an occlusal portion of appliance body 102 may be configured to engage attachment 506 with spring member 504 in a deformed state. For example, third dimension 518 may be less than second dimension 516. In this way, as shown in FIG. 5B, first recess 512 may deform into at least a portion of the void defined by second recess 520 to engage spring member 504 with attachment 506. The deformation of the portion of spring member 504 between first and second recesses 512 and 520 may result in spring force 508.

As shown in FIG. 5B, spring force 508 may be substantially perpendicular to a longitudinal axis of both first and second recesses 512 and 520. In other examples, first recess 512, second recess 520, or both may be positioned, shaped, or both to result in spring force 508 having a different direction. Additionally, a proximity of first and second recesses 512 and 520 may be selected to control the magnitude of spring force 508. For example, a closer proximity of first and second recesses 512 and 520 may reduce an amount of material of spring member 504 between first and second recesses 512 and 520. The reduced amount of material may increase the flexibility of the interstitial space between first and second recesses 512 and 520 and reduce the restorative force resulting from a deformation of first recess 512 into second recess 520. Conversely, in examples in which first and second recesses are further apart, spring force 508 may be greater because the greater amount of material in the interstitial space first and second recesses 512 and 520 may increase the restorative force resulting from a deformation of first recess 512 into second recess 520.

As seen in FIG. 5C, spring force 508 may result in rotation 509A and translation 509B (collectively, "movement 509") of tooth 501. In some examples, spring member 504 may be configured to continue applying force 508 after recess 512 and 520 have returned to an undeformed state, e.g., at least a portion of spring member may remain deformed and move toward an undeformed configuration. Selecting the magnitude and direction of spring force 508 by selecting the position and shape of first and second recesses 512 and 520 may control movement 509.

Although first and second recesses 512 and 520 are illustrated as being positioned and shaped to cause movement 509 of tooth 501 in a mesial-distal direction due to the relative orientation of the interstitial space between first and second recesses 512 and 520, in other examples, the position and shape of first and second recesses 512 and 520 may be different, and may cause one or more spring forces in one or more different directions.

Figure 6A:
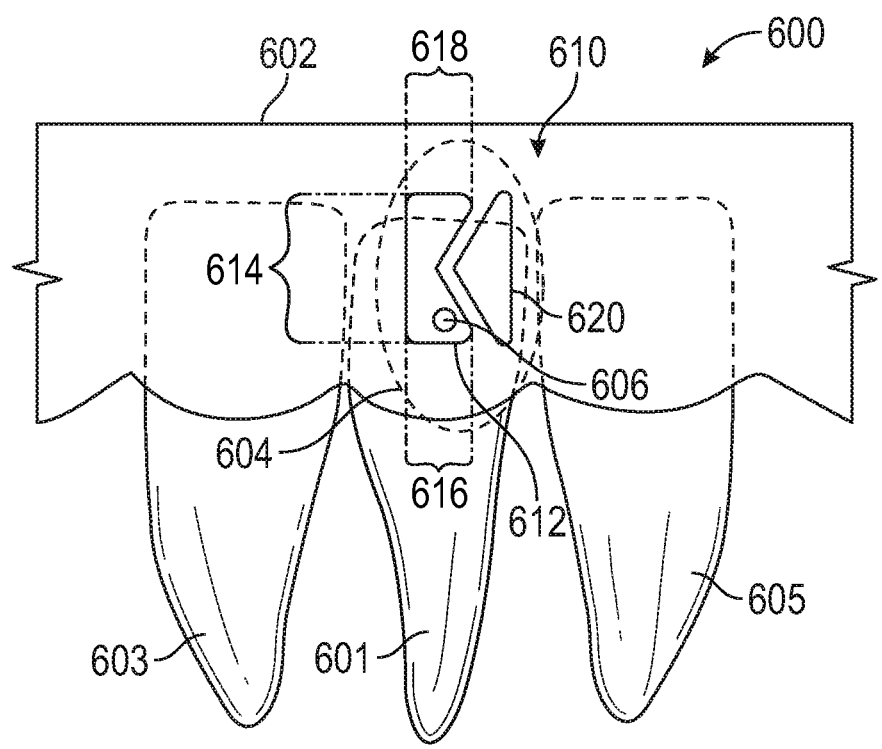
FIGS. 6A, 6B, and 6C illustrate facial views of an example removable dental appliance that includes a shell and a spring member with two recesses configured to facilitate engagement with an attachment and movement of a tooth of a patient.
Figure 6B:
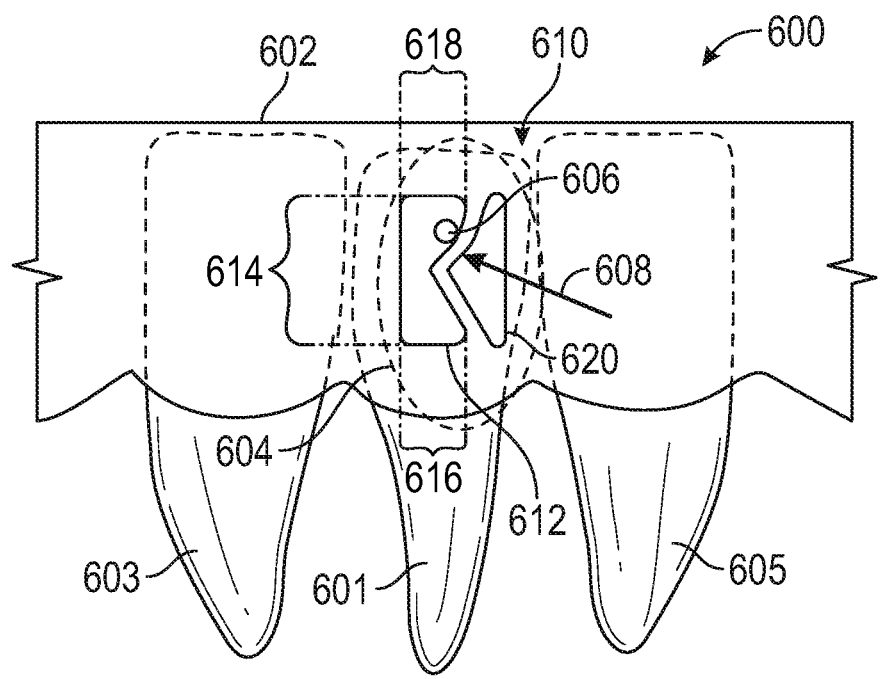
Figure 6C:
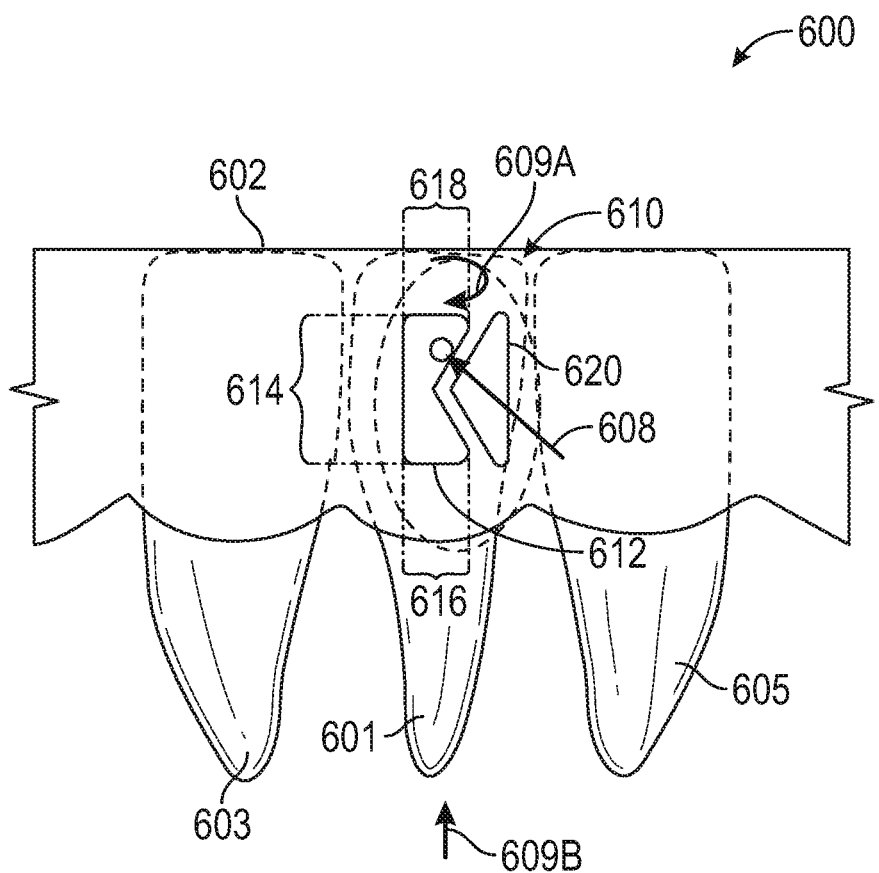

For example, a first recess and a second recess may be positioned and shaped to cause one or more of a tipping force, a torqueing or rotational force, an extrusion force, an intrusion force, or the like. FIGS. 6A, 6B, and 6C illustrate facial views of an example removable dental appliance 600 that includes first and second recesses 612 and 620 to facilitate engagement of a spring member 604 with an attachment 606 on a tooth 601 of a patient. FIG. 6A illustrates a facial view of a portion of removable dental appliance 600 surrounding teeth 601, 603, and 605 in an initial position, e.g., a maloccluded position, in which spring member 604 is not engaged with attachment 606. FIG. 6B illustrates a facial view of a portion of removable dental appliance 600 surrounding teeth 601, 603, and 605 in an initial position, where spring member 604 is engaged with attachment 606. FIG. 6C illustrates a facial view of a portion of removable dental appliance 600 surrounding teeth 601, 603, and 605 in a desired position, e.g., a final position after orthodontic treatment or an intermediate position achieved by use of removable dental appliance 600, where spring member 604 is engaged with attachment 606.

Removable dental appliance 600 may be the same as or substantially similar to removable dental appliance 500 of FIGS. 5A-5C, aside from a different configuration of first and second recesses 612 and 620. Like removable dental appliance 500, removable dental appliance 600 may include an appliance body 602 configured to surround at least teeth 601, 603, and 605. Appliance body 602 may define a shell 610. Appliance body 602 may define a spring member 604 having a first recess 612 and a second recess 620. First recess 612 may be configured to engage an attachment 606 affixed to tooth 601. First recess 612 may include a first dimension 614 substantially perpendicular to a spring force 608, and a second dimension 616 and third dimension 618 substantially parallel to spring force 608. The second recess may facilitate engagement of first recess 612 with attachment 606. The position and shape of first recess 612 and second recess 620 may be selected to control a direction and a magnitude of spring force 608, and the resulting movements 609A and 609B (collectively, "movements 609") of tooth 601.

As shown in FIGS. 6A, 6B, and 6C, first and second recesses 612 and 620 may be positioned and shaped control a direction of spring force 608 and the resulting movement 609 of tooth 601. For example, first and second recess 612 and 620 may be shaped and positioned to define a chevron shaped portion of spring member 604. The chevron shaped portion of spring member 604 may enable first recess to facilitate engagement of spring member 604 with the attachment, as discussed above with reference to FIGS. 5A, 5B, and 5C. Also, as seen in FIG. 6B, the chevron shaped portion of spring member 604 may enable spring force 608 to be applied to attachment 606 in a direction that is perpendicular to one half of the chevron shaped portion of spring member 604. As shown in FIG. 6C, spring force 608 may be applied to attachment 606 at about a 45-degree angle relative to the occlusal plane of tooth 601. Applying spring force at a 45-degree angle may result in a rotation 609A and an extrusion 609B of tooth 601. In this way, first and second recesses 612 and 620 may be positioned and shaped to select the shape and dimensions of the portion of spring member 604 defining the interstitial space between first and second recesses 612 and 620. By selecting the shape and dimensions of the portion of spring member 604 defining the interstitial space between first and second recesses 612 and 620, the removable dental appliance may be used to control the direction and magnitude of spring force 608, and the resulting movement 609 of tooth 601.

Figure 7:
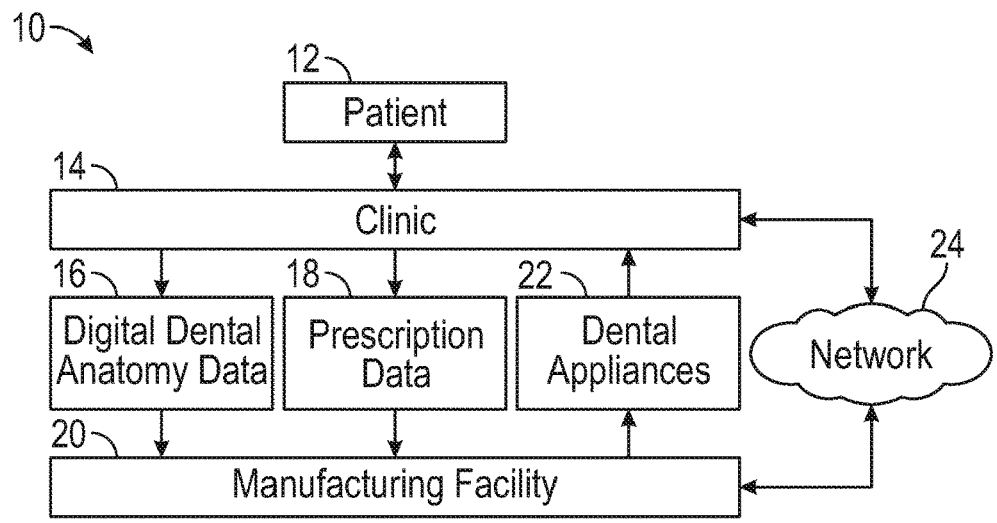
FIG. 7 is a block diagram illustrating an example computer environment in which a clinic and manufacturing facility communicate information throughout a dental appliance manufacturing process.

FIG. 7 is a block diagram illustrating an example computer environment 10 in which clinic 14 and manufacturing facility 20 communicate information throughout a manufacturing process of a set of removable dental appliances 22 for patient 12. Removable dental appliance 22 may be the same as or substantially similar to at least one of removable dental appliances 100, 200, 300, 400, 500, and 600. Initially, an orthodontic practitioner of clinic 14 generates or acquires one or more images of a dental anatomy of patient 12 using any suitable imaging technique and generates digital dental anatomy data 46 (e.g., a digital representation of patient's 12 tooth structure). For example, the practitioner may generate X-RAY images that can be digitally scanned. Alternatively, the practitioner may capture digital images of the patient tooth structure using, for example, conventional computed tomography (CT), laser scanning, intra-oral scanning, CT scans of dental impressions, scans of dental casts poured from impressions, ultrasound instrumentation, magnetic resonance imaging (MRI), or any other suitable method of three-dimensional (3D) data acquisition. In other embodiments, the digital images may be provided using a hand-held intra-oral scanner such as the intra-oral scanner using active wavefront sampling developed by Brontes Technologies, Inc. (Lexington, Mass.) and described in PCT Publication No. WO 2007/084727 (Boerjes, et al.), which is incorporated by reference herein. Alternatively, other intra-oral scanners or intra-oral contact probes may be used. As another option, the digital dental anatomy data 16 may be provided by scanning a negative impression of the teeth of patient 12. As still another option, the digital dental anatomy data 16 may be provided by imaging a positive physical model of the teeth of patient 12 or by using a contact probe on a model of the teeth of patient 12. The model used for scanning may be made, for example, by casting an impression of patient's 12 dentition from a suitable impression material such as alginate or polyvinylsiloxane (PVS), pouring a casting material (such as orthodontic stone or epoxy resin) into the impression, and allowing the casting material to cure. Any suitable scanning technique may be used for scanning the model, including those described above. Other possible scanning methods are described in U.S. Patent Publication No. 2007/0031791 (Cinader et al.), which is incorporated by reference herein.

In addition to providing digital images by scanning the exposed surfaces of the teeth, it is possible to image non-visible features of the dentition, such as the roots of the teeth of patient 12 and the jaw bones of patient 12. In some embodiments, the digital dental anatomy data 16 is formed by providing several 3D images of these features and subsequently "stitching" them together. These different images need not be provided using the same imaging technique. For example, a digital image of teeth roots provided with a CT scan may be integrated with a digital image of the teeth crowns provided with an intraoral visible light scanner. Scaling and registering of two-dimensional (2D) dental images with 3D dental images is described in U.S. Pat. No. 6,845,175 (Kopelman, et al.), which is incorporated by reference herein, and U.S. Patent Publication No. 2004/0029068 (Badura et al.), which is also incorporated by reference herein. Issued U.S. Pat. No. 7,027,642 (Imgrund et al.), which is incorporated by reference herein, and U.S. Pat. No. 7,234,937 (Sachdeva, et al.), which is also incorporated by reference herein, describe using techniques of integrating digital images provided from various 3D sources. Accordingly, the term "imaging" as it is used herein is not limited to normal photographic imaging of visually apparent structures, but includes imaging of dental anatomies that are hidden from view. The dental anatomy may include, but is not limited to, any portion of crowns or roots of one or more teeth of a dental arch, gingiva, periodontal ligaments, alveolar process, cortical bone, implants, artificial crowns, bridges, veneers, dentures, orthodontic appliances, or any structure that could be considered part of the dentition before, during, or after treatment.

To generate digital dental anatomy data 16, a computer must transform raw data from the imaging systems into usable digital models. For example, for raw data representing the shapes of teeth received by a computer, the raw data is often little more than a point cloud in 3D space. Typically, this point cloud is surfaced to create 3D object models of the patient's dentition, including one or more teeth, gingival tissue, and other surrounding oral structure. For this data to be useful in orthodontic diagnosis and treatment, the computer may "segment" dentition surfaces to produce one or more discrete, movable 3D tooth object models representing individual teeth. The computer may further separate these tooth models from the gingiva into separate objects.

Segmentation allows a user to characterize and manipulate the teeth arrangement as a set of individual objects. Advantageously, the computer may derive diagnostic information such as arch length, bite setting, and even American Board of Orthodontics (ABO) objective grading from these models. As a further benefit, the digital orthodontic setups may provide flexibility in the manufacturing process. By replacing physical processes with digital processes, the data acquisition step and data manipulation steps can be executed at separate locations without the need to transport stone models or impressions from one location to another. Reducing or eliminating the need for shipping physical objects back and forth can result in significant cost savings to both customers and manufacturers of customized appliances.

After generating digital dental anatomy data 16, clinic 14 may store digital dental anatomy data 16 within a patient record in a database. Clinic 14 may, for example, update a local database having a plurality of patient records. Alternatively, clinic 14 may remotely update a central database (optionally within manufacturing facility 20) via network 24. After digital dental anatomy data 16 is stored, clinic 14 electronically communicates digital dental anatomy data 16 to manufacturing facility 20. Alternatively, manufacturing facility 20 may retrieve digital dental anatomy data 16 from another source, such as a kiosk or vending machine.

Clinic 14 may also forward prescription data 18 conveying general information regarding a practitioner's diagnosis and treatment plan for patient 12 to manufacturing facility 20. In some examples, prescription data 18 may be more specific. For example, digital dental anatomy data 16 may be a digital representation of the dental anatomy of patient 12. The practitioner of clinic 14 may review the digital representation and indicate desired movements, spacing, or final positions of individual teeth of patient 12. For example, the desired movements, spacing, and final positions of individual teeth of patient 12 may affect the forces to be applied to the teeth of patient 12 at each stage of treatment by each removable dental appliance of the set of removable dental appliances 22. As discussed above, the forces applied by each removable dental appliance (e.g., removable dental appliances 100, 200, 300, 400, 500, and 600) of the set of removable dental appliances 22 may be determined by selecting the dimensions, shapes, and positions of at least one of spring members (e.g., spring member 104, including recess 112), attachments (e.g., attachment 106), shells (e.g., shell 110), positioning members (e.g., positioning member 322), and flexural regions (e.g., flexural regions 326). In this way, digital dental anatomy data 16 may include practitioner selected dimensions, shapes, and positions of at least one of spring members, attachments, shells, positioning members, and flexural regions of each of removable dental appliance of the set of removable dental appliances 22 to result in the desired movement of the teeth of patient 12. Following review of the digital representation, the digital dental anatomy data 16 that includes the selected the dimensions, shapes, and positions of at least one of spring members, attachments, shells, positioning members, and flexural regions of each removable dental appliance of the set of removable dental appliances 22, may be forwarded to manufacturing facility 20. Manufacturing facility 20 may be located off-site, or located with clinic 14.

For example, each clinic 14 may include its own equipment for manufacturing facility 20 such that a treatment plan and digital design may be performed entirely by a clinical practitioner, or an assistant, in the clinical setting, using software installed locally. The manufacturing may be performed in the clinic, as well, by using a 3D printer (or by other methods of additive manufacturing). A 3D printer allows manufacturing of intricate features of a dental appliance or a physical representation of the dental anatomy of patient 12 through additive printing. The 3D printer may use iterative digital designs of original dental anatomy of patient 12 as well as a desired dental anatomy of patient 12 to produce multiple digital appliances, digital appliance patterns, or both customized to produce the desired dental anatomy of patient 12. Manufacturing may include post-processing to remove uncured resin and remove support structures, or to assemble various components, which may also be necessary and could also be performed in a clinical setting.

Manufacturing facility 20 utilizes digital dental anatomy data 16 of patient 12 to construct the set of removable dental appliances 22 to reposition teeth of patient 12. Sometime thereafter, manufacturing facility 20 forwards the set of removable dental appliances 22 to clinic 14 or, alternatively, directly to patient 12. For example, the set of removable dental appliances 22 may be an ordered set of removable dental appliances. Patient 12 then wears the removable dental appliances 22 in the set of removable dental appliances 22 sequentially over time according to a prescribed schedule to reposition the teeth of patient 12. For example, patient 12 may wear each removable dental appliance in the set of removable dental appliances 22 for a period of between about 1 week and about 6 weeks, such as between about 2 weeks and about 4 weeks, or about 3 weeks. Optionally, patient 12 may return to clinic 14 for periodic monitoring of the progress of the treatment with removable dental appliances 22. In some examples, the recess and related attachment mechanisms may be designed such that the spring member may engage with the attachment only within a certain tooth position range. In this way, the removable dental appliance may be configured to provide a self-limiting range of tooth motion. In examples in which the removable dental appliance provides a self-limiting range of tooth motion, patients can be instructed to proceed to the next removable dental appliance in an ordered set of removable dental appliances when the current removable dental appliance passively engages the attachment, or to seek a professional consultation if the recess of the next removable dental appliance in the ordered set does not engage with the attachment.

During such periodic monitoring, a clinician may adjust the prescribed schedule of patient 12 for wearing the removable dental appliances in the set of removable dental appliances 22 sequentially over time. Monitoring generally includes visual inspection of the teeth of patient 12 and may also include imaging to generate digital tooth structure data. In some relatively uncommon circumstances, the clinician may decide to interrupt the treatment of patient 12 with the set of removable dental appliances 22, for example, by sending the newly generated digital dental anatomy data 16 to manufacturing facility 20 to produce a new set of removable dental appliances 22. In the same or different examples, the clinician may send newly generated digital dental anatomy data 16 to manufacturing facility 20 following the completion of the prescribed schedule of the treatment with removable dental appliances 22. In addition, following the completion of the prescribed schedule of the treatment with removable dental appliances 22, the clinician may request a new set of removable dental appliances from manufacturing facility 20 to continue treatment of patient 12.

Figure 8:
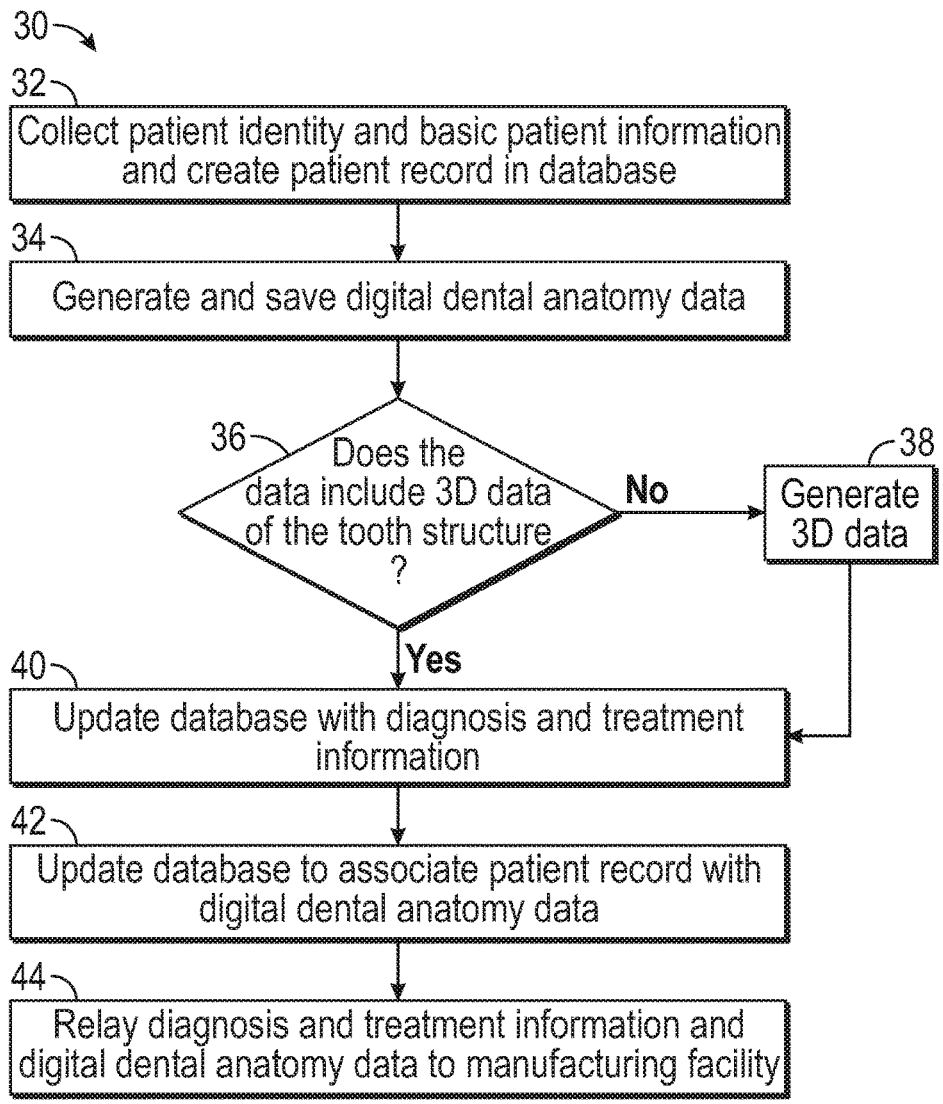
FIG. 8 is a flow diagram illustrating an example process of generating digital tooth structure data.

FIG. 8 is a flow diagram illustrating process 30 conducted at clinic 14 in accordance with one example of this disclosure. Initially, a practitioner at clinic 14 collects patient identity and other information from patient 12 and creates a patient record (32). As described, the patient record may be located within clinic 14 and optionally configured to share data with a database within manufacturing facility 20. Alternatively, the patient record may be located within a database at manufacturing facility 20 that is remotely accessible to clinic 14 via network 24 or within a database that is remotely accessible by both manufacturing facility 20 and clinic 14.

Next, digital dental anatomy data 16 of patient 12 may be generated using any suitable technique (34), to thereby create a virtual dental anatomy. Digital dental anatomy data 16 may be comprised of a two-dimensional (2D) image, a three-dimensional (3D) representation of the dental anatomy, or both.

In one example, 3D representations of a dental anatomy are generated using a cone beam computerized tomography (CBCT) scanner, such as an i-CAT 3D dental imaging device (available from Imaging Sciences International, LLC; 1910 N Penn Road, Hatfield, Pa.). Clinic 14 stores the 3D digital dental anatomy data 16 (in the form of radiological images) generated from the CBCT scanner in the database located within clinic 14, or alternatively, within manufacturing facility 20. The computing system processes the digital dental anatomy data 16 from the CBCT scanner, which may be in the form of a plurality of slices, to compute a digital representation of the tooth structure that may be manipulated within the 3D modeling environment.

If 2D radiological images are used (36), then the practitioner may further generate 3D digital data (38). The 3D digital dental anatomy data 16 may be produced by, for example, forming and subsequently digitally scanning a physical impression or casting of the tooth structure of patient 12. For example, a physical impression or casting of a dental arch of patient 12 may be scanned using a visible light scanner, such as an OM-3R scanner (available from Laser Design, Inc. of Minneapolis, Minn.). Alternatively, the practitioner may generate the 3D digital dental anatomy data 16 of the occlusal surface by use of an intra-oral scan of the dental arch of patient 12, or existing 3D tooth data. In one example, the method of forming a digital scan from a casting or an impression described in U.S. Pat. No. 8,491,306, titled, "REGISTERING PHYSICAL AND VIRTUAL TOOTH STRUCTURES WITH PEDESTALS," and issued on Jul. 23, 2013, which is incorporated herein by reference in its entirety, may be used. In the same or different examples, techniques for defining a virtual tooth surface and virtual tooth coordinate system as described in U.S. Patent Application Publication No. 2013/0325431, titled ORTHODONTIC DIGITAL SETUPS," and published on Dec. 5, 2013 may be used, which is incorporated herein by reference in its entirety. In any case, the digital data are digitally registered within the 3D modeling environment to form a composite digital representation of a tooth structure, which may include the tooth roots as well as the crowns.

In one example, 2D radiological images and the 3D digital data for the occlusal surface of the dental arch are registered by first attaching registration markers (e.g., fiducial markers or a pedestal having known geometry) to the tooth structure of patient 12 prior to generating both the radiological images and the 3D digital scan. Thereafter, the digital representation of the registration markers within the 2D radiological image and the 3D digital data may be aligned within a 3D modeling environment using registration techniques described in U.S. Pat. No. 8,491,306.

In another example, 3D digital data of the tooth structure is generated by combining two 3D digital representations of the tooth structure. For example, a first 3D digital representation may be a relatively low-resolution image of the roots obtained from a CBCT scanner (e.g., an i-CAT 3D dental imaging device) and the second 3D digital representation may be a relatively high resolution image of the crowns of the teeth obtained from an industrial CT scan of an impression or a visible light (e.g., laser) scan of a casting of the dental arch of the patient. The 3D digital representations may be registered using a software program that enables the 3D representations to be manipulated within a computer environment (e.g., Geomagic Studio software (available from 3D Systems, Inc.; 333 Three D Systems Circle, Rock Hill, S.C.), or alternatively, registration techniques described in U.S. Pat. No. 8,491,306 may be used.

Next, a computer system executing 3D modeling software renders a resultant digital representation of the tooth structure, including the crowns as well as the root structure of the patient's dental arch. Modeling software provides a user interface that allows the practitioner to manipulate digital representations of the teeth in 3D space relative to the digital representation of the patient's dental arch. By interacting with the computer system, the practitioner generates treatment information, such as by selecting indications of the final positions of individual teeth of patient 12, duration of a respective stage of treatment, or number of treatment stages, the direction or magnitude of forces on the teeth of patient 12 during a stage of treatment, or the like (40). For example, the final positions of individual teeth of patient 12, duration of a respective stage of treatment, or number of treatment stages may affect the direction or magnitude of forces on the teeth of patient 12 at each stage of treatment by each removable dental appliance of the set of removable dental appliances 22. As discussed above, the forces applied by each removable dental appliance (e.g., removable dental appliances 100, 200, 300, 400, 500, and 600) of the set of removable dental appliances 22 may be determined by selecting the dimensions, shapes, and positions of at least one of spring members (e.g., spring member 104, including recess 112), attachments (e.g., attachment 106), shells (e.g., shell 110), positioning members (e.g., positioning members 322), and flexural regions (e.g., flexural regions 326). In this way, updating the database with diagnostic and treatment information (40) may include determining or selecting by the practitioner the dimensions, shapes, and positions of at least one of spring members, attachments, shells, positioning members, and flexural regions of each of removable dental appliance of the set of removable dental appliances 22 to result in the desired movement of the teeth of patient 12.

Once the practitioner has finished conveying general information regarding a diagnosis and treatment plan within the 3D environment, the computer system updates the database associated with the patient record to record the prescription data 18 conveying general information regarding a diagnosis and treatment plan as specified by the practitioner (42). Thereafter, the prescription data 18 is relayed to manufacturing facility 20 for manufacturing facility 20 to construct one or more removable dental appliances including spring members, such as removable dental appliances 22 (44).

Although described with respect to an orthodontic practitioner located at an orthodontic clinic, one or more of the steps discussed with respect to FIG. 7 may be performed by a remote user, such as a user located at manufacturing facility 20. For example, the orthodontic practitioner may only send radiological image data and an impression or casting of the patient to manufacturing facility 20, where a user interacts with a computer system to develop a treatment plan within a 3D modeling environment. Optionally, a digital representation of the treatment plan within the 3D modeling environment may then be transmitted to the orthodontic practitioner of clinic 14, who may review the treatment plan and either send back his or her approval, indicate desired changes, or directly make changes to the treatment plan. Data collected over time may also be analyzed by machine learning to improve treatment plan performance over time.

Figure 9:
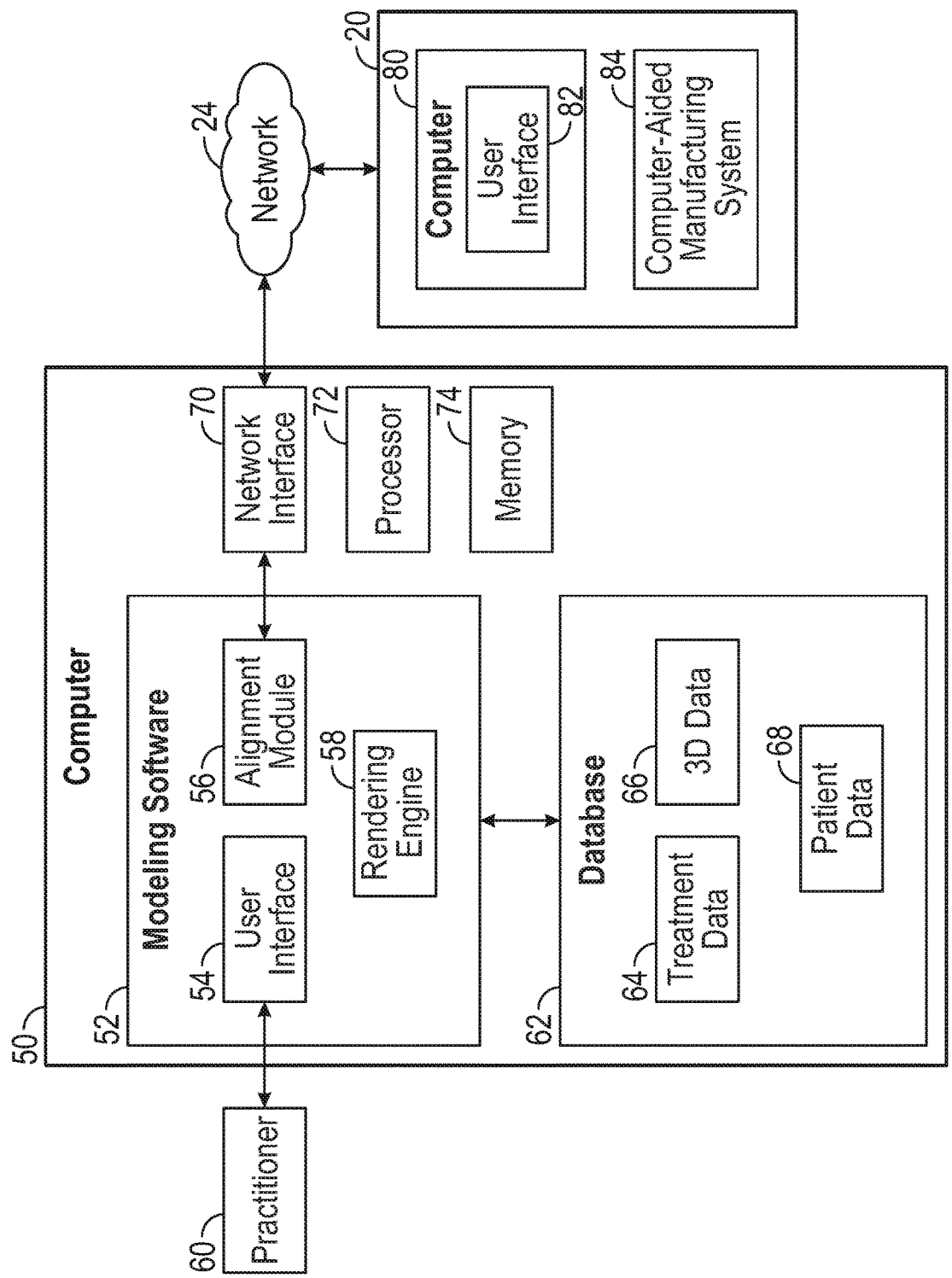
FIG. 9 is a block diagram illustrating an example of a client computer connected to a manufacturing facility via a network to generate digital tooth structure data.

FIG. 9 is a block diagram illustrating an example of a client computer 50 connected to manufacturing facility 20 via network 24. In the illustrated example, client computer 50 provides an operating environment for modeling software 52. Modeling software 52 presents a modeling environment for modeling and depicting the 3D representation of the teeth of patient 12. In the illustrated example, modeling software 52 includes user interface 54, alignment module 56, and rendering engine 58.

User interface 54 provides a graphical user interface (GUI) that visually displays the 3D representation of the teeth of patient 12. In addition, user interface 54 provides an interface for receiving input from practitioner 60 of clinic 14, e.g., via a keyboard and a pointing device, for manipulating the teeth of patient 12 within the modeled dental arch.

Modeling software 52 may be accessible to manufacturing facility 20 via network interface 70. Modeling software 52 interacts with database 62 to access a variety of data, such as treatment data 64, 3D data 66 relating to the tooth structure of patient 12, and patient data 68. Database 62 may be represented in a variety of forms including data storage files, lookup tables, or a database management system (DBMS) executing on one or more database servers. The database management system may be a relational (RDBMS), hierarchical (HDBMS), multi-dimensional (MDBMS), object oriented (ODBMS or OODBMS) or object relational (ORDBMS) database management system. The data may, for example, be stored within a single relational database, such as SQL Server from Microsoft Corporation. Although illustrated as local to client computer 50, database 62 may be located remote from the client computer 50 and coupled to the client computer 50 via a public or private network, e.g., network 24.

Treatment data 64 describes a diagnosis and or repositioning information for the teeth of patient 12 selected by practitioner 60 and positioned within the 3D modeling environment. For example, treatment data 64 may include the dimensions, shapes, and positions of at least one of spring members (e.g., spring member 104, including recess 112), attachments (e.g., attachment 106), shells (e.g., shell 110), positioning members (e.g., positioning members 322), and flexural regions (e.g., flexural regions 326) that may result in a selected magnitude (e.g., within a selected magnitude range) and direction of force vectors to be applied to each tooth throughout the treatment plans.

Patient data 68 describes a set of one or more patients, e.g., patient 12, associated with practitioner 60. For example, patient data 68 specifies general information, such as a name, birth date, and a dental history, for each patient 12.

Rendering engine 58 accesses and renders 3D data 66 to generate the 3D view presented to practitioner 60 by user interface 54. More specifically, 3D data 66 includes information defining the 3D objects that represent each tooth (optionally including roots), and jaw bone within the 3D environment. Rendering engine 58 processes each object to render a 3D triangular mesh based on viewing perspective of practitioner 60 within the 3D environment. User interface 54 displays the rendered 3D triangular mesh to practitioner 60, and allows practitioner 60 to change viewing perspectives and manipulate objects within the 3D environment.

U.S. Pat. No. 8,194,067, titled, "PLANAR GUIDES TO VISUALLY AID ORTHODONTIC APPLIANCE PLACEMENT WITHIN A THREE-DIMENSIONAL (3D) ENVIRONMENT," issued on Jun. 5, 2012, and U.S. Pat. No. 7,731,495, titled, "USER INTERFACE HAVING CROSS SECTION CONTROL TOOL FOR DIGITAL ORTHODONTICS," issued on Jun. 8, 2010, describe other examples for computer systems and 3D modeling software having user interfaces that may be used with the techniques described herein, each of which are incorporated by reference in their entireties.

Client computer 50 includes processor 72 and memory 74 to store and execute modeling software 52. Memory 74 may represent any volatile or non-volatile storage elements. Examples include random access memory (RAM) such as synchronous dynamic random access memory (SDRAM), read-only memory (ROM), non-volatile random access memory (NVRAM), electrically erasable programmable read-only memory (EEPROM), and FLASH memory. Examples may also include non-volatile storage, such as a hard-disk, magnetic tape, a magnetic or optical data storage media, a compact disk (CD), a digital versatile disk (DVD), a Blu-ray disk, and a holographic data storage media.

Processor 72 represents one or more processors such as a general-purpose microprocessor, a specially designed processor, an application specific integrated circuit (ASIC), a field programmable gate array (FPGA), a collection of discrete logic, or any type of processing device capable of executing the techniques described herein. In one example, memory 74 may store program instructions (e.g., software instructions) that are executed by processor 72 to carry out the techniques described herein. In other examples, the techniques may be executed by specifically programmed circuitry of processor 72. In these or other ways, processor 72 may be configured to execute the techniques described herein.

Client computer 50 is configured to send a digital representation of a 3D tooth structure of a patient, and optionally, treatment data 64, patient data 68, or both to computer 80 of manufacturing facility 20 via network 24. Computer 80 includes user interface 82. User interface 82 provides a GUI that visually displays the 3D representation of the digital model of teeth. In addition, user interface 82 provides an interface for receiving input from a user, e.g., via a keyboard and a pointing device, for manipulating a patient's teeth within the digital representation of the 3D tooth structure of the patient.

Computer 80 may further be configured to determine dimensions and shapes of a set of removable dental appliances 22 for patient 12. The dimensions and shapes of removable dental appliance 22 may include a position, dimension, and shape of at least one of spring members, attachments, shells, positioning members, and flexural regions such that set of removable dental appliances 22 is configured to reposition the one or more teeth from their initial positions to desired positions when worn by the patient. As discussed above, the position, dimension, and shape of at least one of spring members, attachments, shells, positioning members, and flexural regions may affect the magnitude, direction, and length of expression of a force applied to the teeth when the removable dental appliance is worn by the patient. For example, the position, dimension, and shape of a respective spring member may determine, at least in part, the magnitude, direction, and length of expression of the force resulting from a deformation of the respective spring member when the removable dental appliance is worn by the patient. The position, dimension, and shape of a respective recess (or pair of recesses) may determine, at least in part, the magnitude, direction, and length of expression of the force resulting from a deformation of the respective spring member when the removable dental appliance is worn by the patient. The position, dimension, and shape of a respective attachment affixed to a respective tooth may also determine, at least in part, the direction of the force that may be transferred from the respective spring member to a respective tooth. The position, dimension, and shape of a respective shell may affect engagement with a respective tooth, such as controlling expression of a tooth movement, and may affect the direction or magnitude of force applied to the respective tooth by controlling the anchoring of spring member with adjacent teeth. The position, dimension, and shape of a respective positioning member may contribute to the magnitude of the spring force applied to a respective attachment by a respective spring member. The position, dimension, and shape of a respective flexural regions may decrease the magnitude of the spring force applied to a respective attachment by decreasing the amount of material in the region of a respective spring member that may be deformed. Computer 80 may analyze at least one of the magnitude, direction, and length of expression of the force resulting from a deformation of the respective spring member when the removable dental appliance is worn by the patient to determine at least one of position, dimension, and shape of at least one of spring members, attachments, shells, positioning members, and flexural regions that will result in a desired movement of the patient's teeth when the removable dental appliance is worn by the patient. Computer 80 may transmit, or otherwise send, a digital model of the set of removable dental appliance 22, the dimensions and shapes of the set of removable dental appliances 22, or both, to computer-aided manufacturing system 84 for production of the set of removable dental appliances 22.

For example, computer 80 may be configured to determine at least one of the dimensions and shapes. Computer 80 may present a representation of the removable dental appliance 22 for user to review, including review of dimensions and shapes. Alternatively, or additionally, computer 80 may accept input from a user to determine dimensions and shapes of set of removable dental appliances 22 for patient 12. For example, the user input may influence at least one of an automatically determined dimensions or shapes.

Client computer 50 and computer 80 are merely conceptual representations of an example computer system. In some examples, the functionalities described with respect to of client computer 50, computer 80, or both may be combined into a single computer or distributed among multiple computers within a computer system. For example, cloud computing may be used for digital design of dental appliances described herein. In one example, the digital representations of tooth structures are received at one computer at the clinic, while a different computer, such as computer 80, is used to determine the shapes and dimensions of a removable dental appliance. In addition, it may not be necessary for that different computer, such as computer 80, to receive all of the same data in order for it determine shapes and dimensions. Shapes and dimensions may be determined, at least in part, based on knowledge derived through analysis of historical cases or virtual models of exemplary cases, without receiving a complete 3D representation of the case in question. In such an example, data transmitted between client computer 50 and computer 80, or otherwise utilized to design a custom dental appliance may be significantly less than the complete data set representing a complete digital dental model of a patient.

Figure 10:
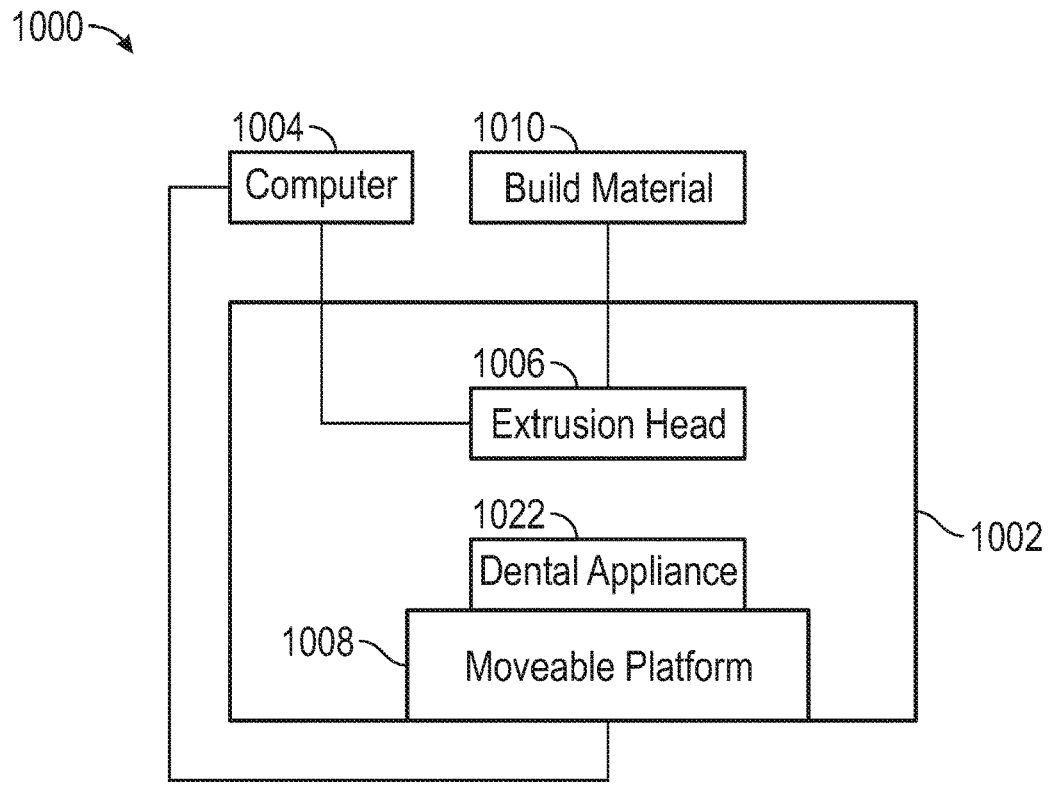
FIG. 10 is a block diagram illustrating an example computer-aided manufacturing system for construction of a removable dental appliance.

FIG. 10 is a block diagram illustrating an example computer-aided manufacturing system 1000 for construction of removable dental appliance 1022. Computer-aided manufacturing system 1000 may include an additive manufacturing system 1002 in communication with computer 1004 and coupled to build material source 1010. In some examples, computer-aided manufacturing system 1000 may include computer-aided manufacturing system 84 of FIG. 9. For example, computer 1004 may be the same as or substantially similar to computer 80. Build material source 1010 may include a source of at least one polymeric material, such as, for example, at least one of the polymeric materials of appliance body 102 discussed above. Dental appliance 1022 may be the same as or substantially similar to at least one of removable dental appliances 100, 200, 300, 400, 500, and 600. In some examples, dental appliance 1022 may include one dental appliance of a set of dental appliances 22.

Additive manufacturing system 1002 may include a movable platform 1008 and an extrusion head 1006. Movable platform 1008 and extrusion head 1006 may be configured to manufacture dental appliance 1022. For example, computer 1004 may control extrusion head 1006 and movable platform 1008 to manufacture removable dental appliance 1022. Controlling, by computer 1004, extrusion head 1006 may include at least one of controlling a material feed rate from build material source 1010 to extrusion head 1006, controlling a deposition rate of build material on dental appliance 1022, controlling a temperature of extrusion head 1006, and controlling a position of extrusion head 1006. By controlling at least one of a material feed rate, a material deposition rate, a temperature of extrusion head 1006, and a position of extrusion head 1010, computer 1004 may control manufacture of a position, dimension, and shape of at least a portion of dental appliance 1022. Controlling, by computer 1004, movable platform 1008 may include at least one of controlling a translation of movable platform in a plane normal to the direction of material deposition from extrusion head 1006 and controlling an elevation of movable platform along an axis substantially parallel to the direction of material deposition from extrusion head 1006. By controlling at least one of a translation and elevation of movable platform 1008, computer 1004 may control manufacture of a position, dimension, and shape of at least a portion of dental appliance 1022.

Although FIG. 15 illustrates a computer-aided manufacturing system 1400 configured for Fused Deposition Modeling (FDM), computer-aided manufacturing system 1400 may also be configured for stereolithography (SLA), inverse vat polymerization additive manufacturing, inkjet/polyjet additive manufacturing, or other methods of additive manufacturing. In examples in which computer-aided manufacturing system 1400 is configured for polyjet printing, computer-aided manufacturing system 1400 may be configured to print multiple materials in a single print, thereby allowing a high modulus material for the rigid components of dental appliance 1422 (e.g., shells) and a low modulus or elastomeric material for the less rigid components of dental appliance 1422 (e.g., spring members). Further, with polyjet additive manufacturing, the modulus may be varied selectively across the dental appliance 1422, and a different modulus may be used for the spring member than is used for the shells, for different parts of a spring member, or for different parts of a shell, for example. Similarly, a different modulus may be used for the anchoring shells than is used for the shell used to reposition individual teeth.

Figure 11:
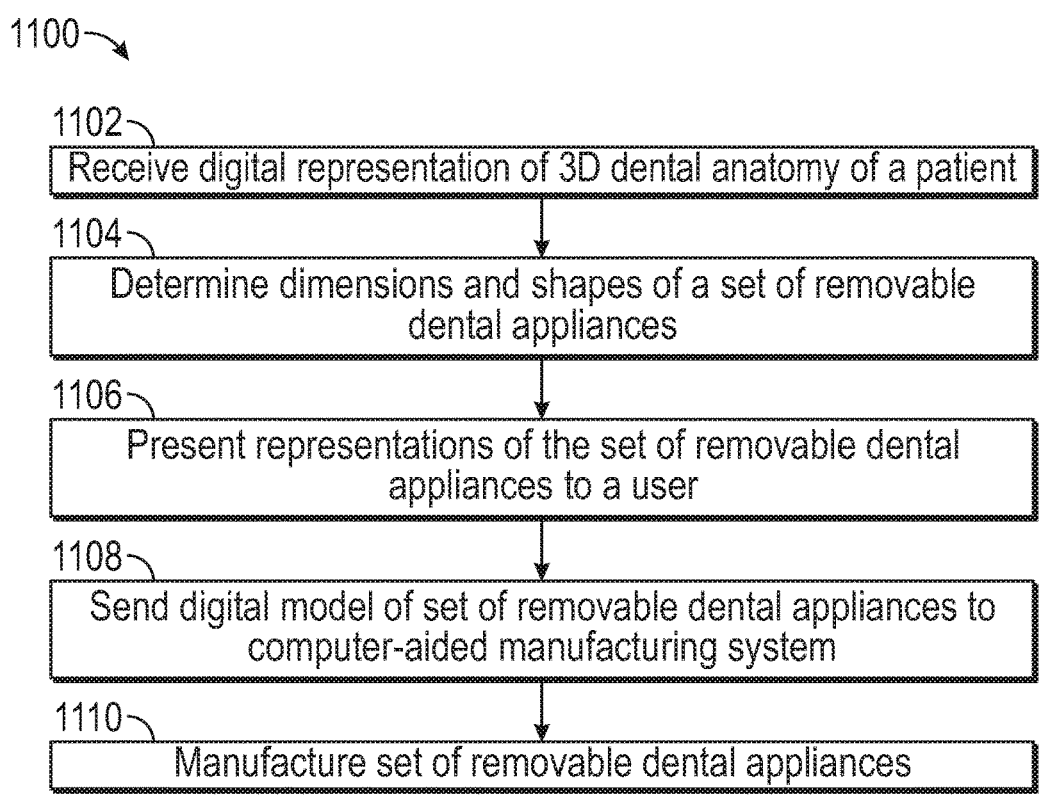
FIG. 11 is a flow diagram illustrating a process conducted at a manufacturing facility for construction of a set of removable dental appliances.

FIG. 11 is a flow diagram illustrating process 1100 conducted at manufacturing facility 20 for construction of set of removable dental appliances 22. In some examples, set of removable dental appliances 22 may include at least one of removable dental appliances 100, 200, 300, 400, 500, and 600. Computer 80 at manufacturing facility 20 receives digital dental anatomy data 16 including initial positions of one or more teeth of the patient and prescription data 18 (1102) from clinic 14. Alternatively, computer 80 may retrieve the information from a database located within or otherwise accessible by computer 80. A trained user associated with computer 80 may interact with a computerized modeling environment running on computer 80 to develop a treatment plan relative to the digital representation of the patient's tooth structure and generate prescription data 18, if clinic 14 has not already done so. In other examples, computer 80 may automatically develop a treatment plan based solely on the patient's tooth structure and predefined design constraints.

Once computer 80 receives patient's tooth structure, computer 80 determines dimensions and shapes of a removable dental appliance for the patient (1104). The dimensions and shapes of the removable dental appliance are configured to reposition the one or more teeth of the patient from their initial positions to final positions when the removable dental appliance is worn by the patient. In the same or additional examples, computer 80 determines dimensions and shapes of set of removable dental appliances 22 for the patient configured to be worn in series.

In some examples, determining dimensions and shapes of the removable dental appliance includes selecting, with computer 80, the dimensions and shapes of the removable dental appliance according to a set of predefined design constraints. The set of predesigned design constraints may include one or more factors, including, but not limited to, at least one of a minimum and a maximum localized force applied to one or more of the surrounded teeth, at least one of a minimum and a maximum rotational force applied to one or more of the surrounded teeth, at least one of a minimum and a maximum translational force applied to one or more of the surrounded teeth, at least one of a minimum and a maximum total force applied to one or more of the surrounded teeth, and at least one of a minimum and a maximum stress or strain applied to the removable dental appliance, when the removable dental appliance is worn by the patient and the surrounded teeth are in their initial positions.

Computer 80 may use finite element analysis (FEA) techniques to analyze forces on a patient's teeth as well as the removable dental appliance during the determination of the dimensions and shapes of the removable dental appliance. For example, computer 80 may apply FEA to a solid model of the patient's teeth as the modeled teeth move from their initial positions to their final positions representing a treatment including an ordered set of removable dental appliances. Computer 80 may use FEA to select the appropriate removable dental appliance to apply the desired forces on the teeth. In addition, computer 80 may use a virtual articulator to determine contact points between the teeth throughout the movement of the modeled teeth during the treatment. Computer 80 may further include occlusal contact forces, such as interdigitation forces, in the FEA forces analysis in combination with forces from the removable dental appliance during the design of dental appliances in an ordered set of removable dental appliances. Computer 80 may further determine an order in which teeth are to be moved to optimize the application of forces, reduce treatment time, improve patient comfort, or the like. Computer 80 may further determine an overcorrection of the dentition to account for relapse after treatment is ended.

In some examples, determining dimensions and shapes of removable dental appliance 100 includes selecting, with computer 80 thicknesses of the appliance body (e.g., 102), including at least one of spring members (e.g., spring member 104), recesses (e.g., recess 112 or 520), attachments (e.g., attachment 106), shells (e.g., shell 110), positioning members (e.g., positioning members 322), and flexural regions (e.g., flexural regions 326), to provide a stiffness suitable to reposition the one or more teeth of the patient from their initial positions to final positions when removable dental appliance 100 is worn by the patient. In some examples, the selected thickness may range between about 0.10 millimeters and about 2.0 millimeters, such as between about 0.20 and about 1.0 millimeters, or between about 0.30 and about 0.75 millimeters. In some examples, computer 80 may further select a material of the removable dental appliance according to the predefined design constraints.

Optionally, the dimensions and shapes of a removable dental appliance for the patient may be presented to a user via user interface of 82 of computer 80 (1106). In examples in which dimensions and shapes of the removable dental appliance are presented to a user via user interface of 82, the user may have the opportunity to adjust the design constraints or directly adjust the dimensions and shapes of the removable dental appliance before the design data is sent to computer-aided manufacturing system 84. In some examples, the dimensions and shapes of the removable dental appliance may be presented to a user by computer 80 directly as the removable dental appliance is manufactured by computer-aided manufacturing system 84. For examples, computer 80 may send a digital model of the removable dental appliance to computer-aided manufacturing system 84, and computer-aided manufacturing system 84 manufactures the removable dental appliance according to the digital model from computer 80.

However, even in examples where the dimensions and shapes of a removable dental appliance for the patient may be presented to a user via user interface of 82 of computer 80, following user approval, computer 80 sends a digital model of the removable dental appliance to computer-aided manufacturing system 84 (1108), and computer-aided manufacturing system 84 manufactures the removable dental appliance according to the digital model from computer 80 (1110).

In some examples, computer-aided manufacturing system 84 may include a 3D printer. Forming the appliance body may include printing at least one of spring members, attachments, shells, positioning members, and flexural regions with the 3D printer. In other examples, forming the appliance body may include printing representations of the patient's teeth with the 3D printer, thermoforming the appliance body over the representations of the teeth, and trimming excess material to form at least one of spring members, attachments, shells, positioning members, and flexural regions. The representations of the teeth of the patient may include raised surfaces to facilitate forming the at least one of spring members, attachments, shells, positioning members, and flexural regions, in the thermoformed and trimmed appliance body.

The techniques of FIG. 11 may be applied to design and manufacture of each of an ordered set of removable dental appliances 22. For example, each removable dental appliance in the ordered set of removable dental appliances 22 may be configured to incrementally reposition the teeth of the patient. In this manner, the ordered set of removable dental appliances 22 may be configured to reposition the teeth of the patient to a greater degree than any one of the removable dental appliances within the set of the removable dental appliances 22. Such an ordered set of removable dental appliances 22 may specifically be configured to incrementally reposition the one or more teeth of the patient from their initial positions to final positions as the removable dental appliances of the ordered set of removable dental appliances 22 for the patient are worn sequentially by the patient.

In some examples, the techniques described with respect to FIG. 11 may be embodied within a computer-readable storage medium, such as a computer-readable storage medium of computer 50, computer 80, or computer 1004. The computer-readable storage medium may store computer-executable instructions that, when executed, configure a processor to perform the techniques described with respect to FIG. 11.

Following the design of set of removable dental appliances 22, manufacturing facility 20 fabricates set of removable dental appliances 22 in accordance with the digital dental anatomy data 16 and prescription data 18 (1110). Construction of removable dental appliances 22 may include 3D printing, thermoforming, injection molding, lost wax casting, 5-axis milling, laser cutting, hybrid plastic and metal manufacturing techniques, such as snap-fitting and overmolding, as well as other manufacturing techniques.

Figure 12:
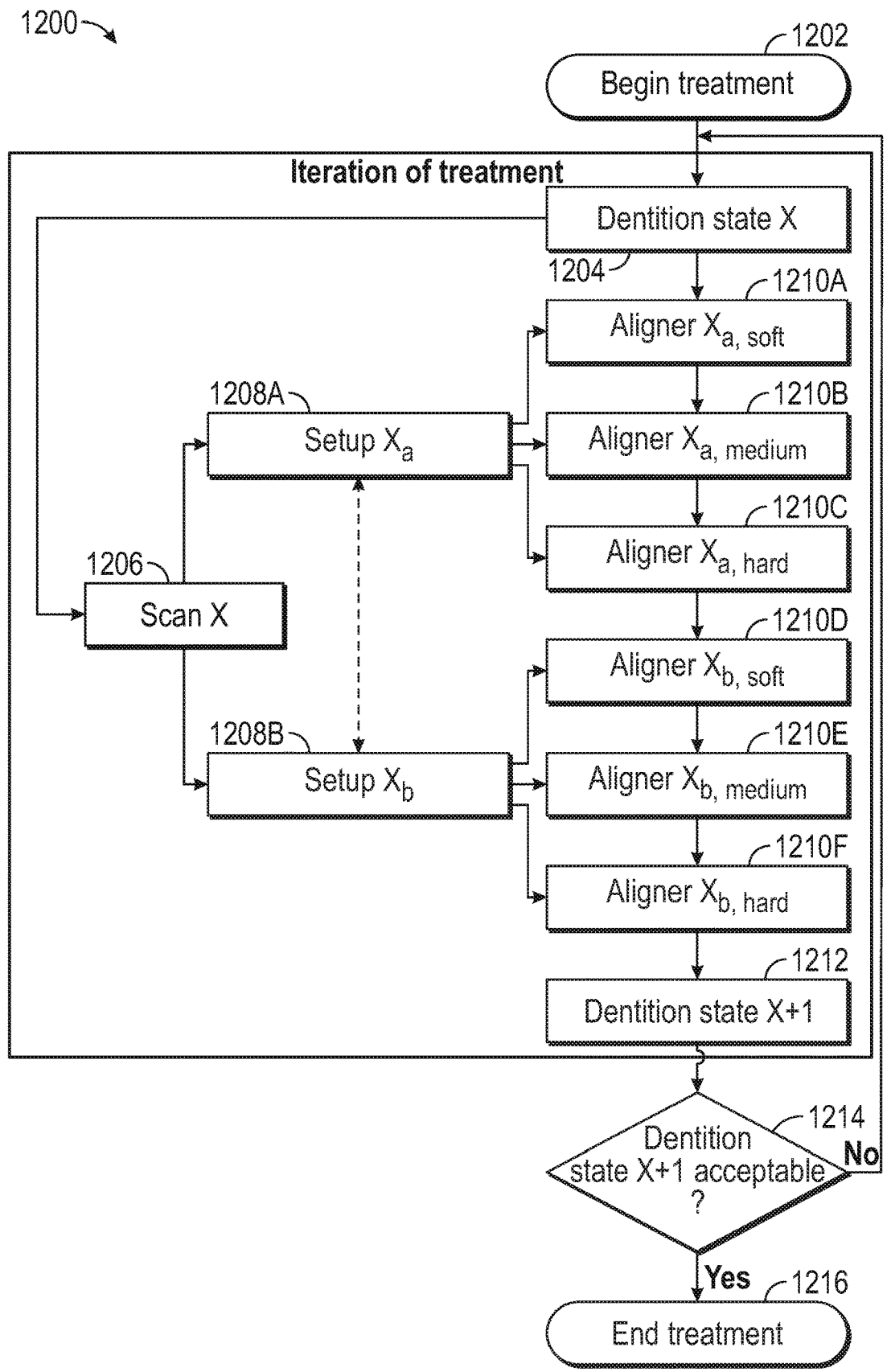
FIG. 12 is a flow diagram illustrating successive iterations of treatment using an ordered set of removable dental appliances.

FIG. 12 is a flow diagram 1200 illustrating successive iterations of treatment using an ordered set of removable dental appliances. The ordered set of removable dental appliances is configured to reposition one or more teeth of a patient. In some examples, the ordered set of removable dental appliances may include at least one of removable dental appliances 100, 200, 300, 400, 500, and 600.

Treatment begins with the first iteration of treatment (1202). At the beginning of the first iteration of treatment, the patient's teeth are at their initial positions as represented by detention state X (1204). A scan of the patient's teeth, for example, as described above, are taken to facilitate the design of the ordered set of removable dental appliances (1206). From the scan of patient's teeth, a computer, e.g., computer 50, determines two different shape and dimensions for removable dental appliances in the ordered set: first setup $X_a$ 1208A and second setup $X_b$ 1208B. Example techniques for creating a digital model of a patient's teeth are described in U.S. Pat. No. 8,738,165 to Cinader et al., titled, "METHODS OF PREPARING A VIRTUAL DENTITION MODEL AND FABRICATING A DENTAL RETAINER THEREFROM," and issued on May 27, 2014. U.S. Pat. No. 8,738,165 is herein incorporated by reference in its entirety. The computer may determine first setup $X_a$ 1208A and second setup $X_b$ 1208B by first adjusting the digital model of the patient's teeth to create a model of the desired position of the patient's teeth following the therapy. Then, the computer may create the shape and dimensions for removable dental appliances in the ordered set based on the time and forces required to move the patient's teeth from the initial positions to their desired positions. For example, the computer model may adjust the thicknesses, positions, shapes, and dimensions of at least one of a shell, a spring member, a recess, and an attachment of the removable dental appliances in the ordered set to produce the forces required to move the patient's teeth from the initial positions to their desired positions. The modeled forces applied by removable dental appliances in the ordered set may further be based on the incremental positional movements of the patient's teeth during the treatment. In this manner, the computer may design each of the removable dental appliances in the ordered set according to expected forces applied on the teeth in the predicted positions of the teeth at the time during the treatment the removable dental appliances in the ordered set is to be worn by the patient.

In some examples, at least one, such as three, different removable dental appliances in the set of removable dental appliances can be manufactured using each of first setup $X_a$ 1208A and second setup $X_b$ 1208B to produce at least two, such as six, removable dental appliances in the set of removable dental appliances. For example, first setup $X_a$ 1208A may be used to manufacture first removable dental appliance $X_{a,\ SOFT}$ 1210A, second removable dental appliance $X_{a,\ MEDIUM}$ 1210B, and third removable dental appliance $X_{a,\ HARD}$ 1210C; and second setup $X_b$ 1208B may be used to manufacture fourth removable dental appliance $X_{b,\ SOFT}$ 1210D, fifth removable dental appliance $X_{b,\ MEDIUM}$ 1210E, and sixth removable dental appliance $X_{b,\ HARD}$ 1210F. First, second, and third removable dental appliances 1210A to 1210C may be substantially the same shape and dimensions, but may comprise materials with different stiffness characteristics. For example, the second and third removable dental appliances 1210B and 1210C may have higher stiffness characteristics than first removable dental appliance 1210A, and third removable dental appliance 1210C may have higher stiffness characteristics than second removable dental appliance 1210B. Similarly, the fourth, fifth, and sixth removable dental appliances 1210D to 1210F may be substantially the same shape and dimensions, but comprise materials with different stiffness characteristics. In some examples, first removable dental appliance 1210A may have the same stiffness characteristics as the fourth removable dental appliance 1210D, such as a relatively soft polymeric material. Similarly, second removable dental appliance 1210B may have the same stiffness characteristics as the fifth removable dental appliance 1210E, such as a relatively stiffer polymeric material than first removable dental appliance 1210A. Likewise, third removable dental appliance 1210C may have the same stiffness characteristics as the sixth removable dental appliance 1210F, such as a relatively stiffer polymeric material than second removable dental appliance 1210B.

Removable dental appliances 1210A to 1210F in the ordered set of removable dental appliances may be worn in sequence over time by the patient. For example, each of removable dental appliances 1210A to 1210F in the ordered set of removable dental appliances may be worn between about 1 week and about 6 weeks, such as between about 2 weeks and about 4 weeks, or about 3 weeks. Following the treatment plan using removable dental appliances 1210A to 1210F, the patient's teeth may be at their final positions for the first iteration of treatment as represented by detention state X+1 (1212).

Once patient's teeth are at or near dentition state X+1, the patient may return to the clinician who may evaluate the result of the first iteration of treatment (1214). If the first iteration of treatment has resulted in acceptable final positions of the patient's teeth, then the treatment may be ended (1216). However, if the first iteration of treatment did not result in acceptable final positions of the patient's teeth, one or more additional iterations of treatment may be performed. To begin the next iteration of treatment, the clinician may take another scan of the patient's teeth to facilitate the design of a subsequent ordered set of removable dental appliances (1206). In some examples, evaluation of the result of the first iteration of treatment may include taking another scan of the patient's teeth, in which case beginning the next iteration of treatment may simply involve forwarding the digital model of the patient's teeth to a manufacturing facility so that another ordered set of removable dental appliances may be manufactured for the patient based on the new positions of the patient's teeth. In yet other examples, the newly acquired scan may be used to create one or more iterations of removable dental appliances in the clinician's facility.

The techniques of FIG. 12 represent one specific example, and a variety of modifications may be made to the techniques of FIG. 12 within the spirit of this disclosure. For example, an ordered set of removable dental appliances may include more or less than six removable dental appliances. As another example, each removable dental appliance in the ordered set of removable dental appliances may have unique shapes and dimensions, and each removable dental appliance in the ordered set of removable dental appliances may be made of material having substantially the same or similar stiffness characteristics. As another example, each removable dental appliance in the ordered set of removable dental appliance may include unique spring member configurations, including but not limited to, the thickness of the spring member, the size and position of the recess, and the shape and position of the spring member, such that each removable dental appliance includes a unique direction or magnitude of force applied to the attachment.

EXAMPLES

Figure 13A:
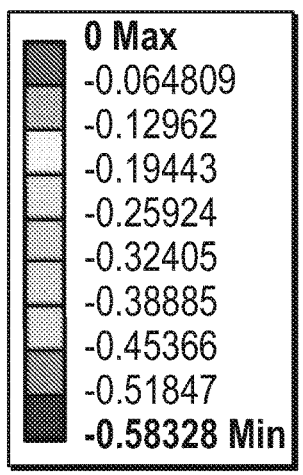
FIGS. 13A and 13B illustrate a directional deformation diagram and an equivalent stress diagram for modeled a spring member of a removable dental appliance.
Figure 13A:
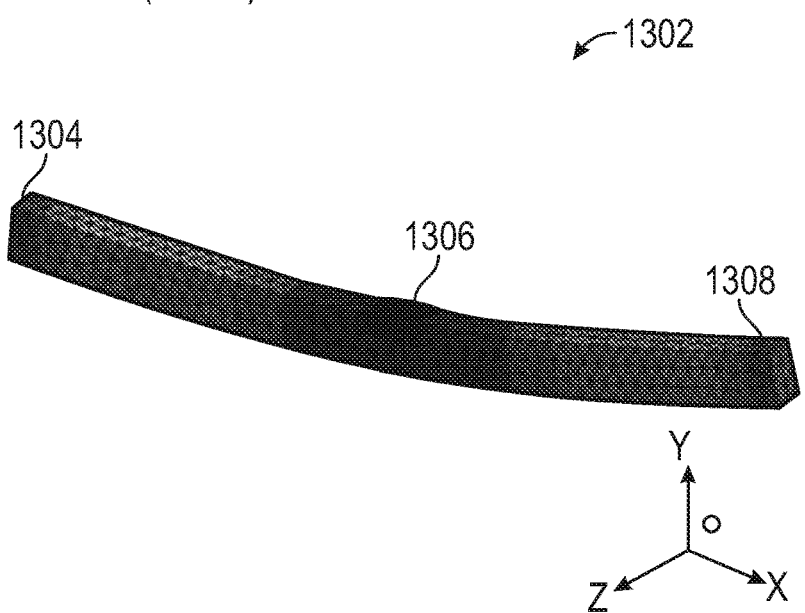
Figure 13B:
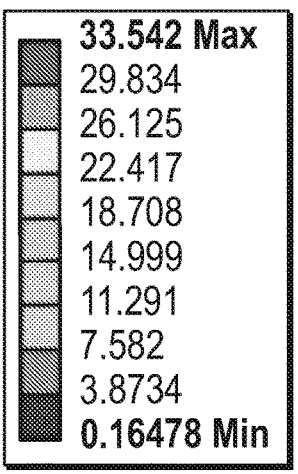
Figure 13B:
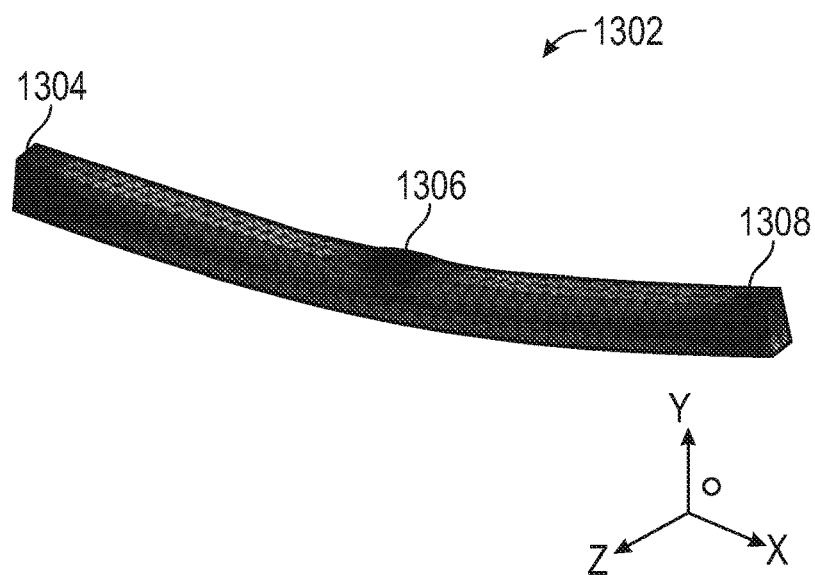

Example 1: FIGS. 13A and 13B illustrate a directional deformation diagram 1300 and an equivalent stress diagram 1310 for a modeled spring member of a removable dental appliance. The removable dental appliance may be the same as or substantially similar to removable dental appliance 100. For the purposes of modeling, the first dimension 114 was 15 millimeters, the thickness of spring member 104 was 0.625 millimeters. The distance between the gingival edge or recess 112 and the most gingival portion of appliance body 102 was 1.0 millimeters. Appliance body 102 material was modeled as DURAN, available from Scheu Dental, Iserlohn, Germany, with an elastic modulus of approximately 2200 MPa. Spring force 108 was applied to the middle of recess 112. Spring member 104 was modeled as beam 1302 with center 1306 and end 1304 fixed along axes x, y, and z (and beam 1302 was allowed to rotate about the fixed edge 1304) and end 1308 fixed along the y-axis (vertical axis) and allowed to move along the x-axis and z-axis.

Spring force 108 was modeled as a force of 100 gram-force (0.981 Newton) applied at center 1306, e.g., an initial position of tooth 101. Also, spring force 108 was modeled as a force of 60 gram-force (0.588 Newton) applied at center 1306, e.g., after movement of tooth 101 to the desired position of tooth 101. The maximum strain was 1.52%. The maximum displacement ($\delta$) of spring member 104 was calculated as $$\delta = \frac{(PL^3)}{48EI}$$

where P is the spring force 108 applied by spring member 104 to attachment 106 (e.g., 100 gram-force and 60 gram-force), L is the first dimension of recess 112 (e.g., recess is 15 millimeters in length), E is the elastic modulus of the appliance body material (e.g., 2200 MPa), and $$I = \frac{1}{12}bh^3$$

where b is the thickness of the spring member 104 (e.g., 0.625 millimeters) and h is the distance from the edge of recess 112 to the gingival most portion of appliance body 102 (e.g., 1.0 millimeters). For a force of 100 gram-force, the maximum displacement was determined to be about 0.60 millimeters. For a force of 60 gram-force, the maximum displacement was determined to be about 0.36 millimeters. Assuming that 60 gram-force is the minimum force to cause alveolar bone remodeling, the modeled spring member may move tooth 101 about 0.24 millimeters.

As shown in FIG. 13A, deformation of beam 1302 in response to a 100 gram-force spring force 108 is distributed across beam 1302 in the y-axis. The maximum deformation of beam 1302 is about 0.60 millimeters in the center 1306 of beam 1302. As shown in FIG. 17B, a stress gradient is formed across beam 1302 with a maximum at center 1306 and minima near fixed ends 1304 and 1308. The example of FIGS. 13A and 13B shows that a removable dental appliance with a spring member engaged with an attachment on a tooth of a patient may result in movement of the tooth with reduced deformation of the shell surrounding the tooth. As discussed above, reducing deformation and stress in the shells may increase engagement of the shells with the respective teeth and improve control of the movement of the teeth.

Various examples have been described. These and other examples are within the scope of the following claims.

What is claimed is:

1. A removable dental appliance comprising:
an appliance body configured to at least partially surround a plurality of teeth of a dental arch of a patient, the appliance body comprising a unitary material defining a shell shaped to receive at least one tooth of the patient and a spring member integrally formed with the shell, wherein the spring member comprises a first elongate recess shaped and positioned to apply a spring force to an attachment in a selected direction and with a selected magnitude, and a second elongate recess shaped and positioned relative to the first recess to apply the spring force to the attachment in the selected direction and with the selected magnitude,
wherein the spring member is configured to receive an attachment, wherein the attachment is configured to affix to the at least one tooth and the second recess configured to reduce at least one of compression, strain, and tension otherwise present in the material of the spring member as the spring member deforms when the first recess is engaged with the attachment, and
wherein the spring member is configured to allow movement of the attachment and apply a spring force to the attachment to cause at least one of a rotation, a translation, a tipping, a torqueing, an extrusion, or an intrusion of the at least one tooth toward a desired position of the at least one tooth when the removable dental appliance is worn by the patient.

2. The removable dental appliance of claim 1, wherein the first elongate recess extends through the appliance body from an inner surface to an outer surface of the body.

3. The removable dental appliance of claim 2, wherein a first portion of the first elongate recess nearer a gingival portion of the appliance body is configured to engage the attachment with the spring member in an undeformed state, and wherein a second portion of the first elongate recess nearer an occlusal portion of the appliance body is configured to engage the attachment with the spring member in a deformed state.

4. The removable dental appliance of claim 1, wherein at least one of the first recess or the second recess comprises a first dimension extending substantially perpendicular to a direction of the spring force and a second dimension extending substantially parallel to the direction of the spring force, and wherein the first dimension is greater than the second dimension.

5. The removable dental appliance of claim 1, wherein at least one of the first recess or the second recess includes a non-linear slot shape.

6. The removable dental appliance of claim 5, wherein the first recess deforms into at least a portion of a void defined by the second recess to engage the spring member with the attachment, the deformation resulting in the positioning force.

7. The removable dental appliance of claim 1, wherein the appliance body comprises a positioning member configured to facilitate engagement of the spring member with the attachment in response to a positioning force being applied to the positioning member.

8. A system comprising:
an ordered set of removable dental appliances configured to reposition one or more teeth of a patient, each removable dental appliance in the set of removable dental appliances comprising: an appliance body configured to at least partially surround a plurality of teeth of a dental arch of a patient, the appliance body comprising a unitary material defining a shell shaped to receive at least one tooth of the patient and a spring member integrally formed with the shell, wherein the spring member comprises a first elongate recess shaped and positioned to apply a spring force to an attachment in a selected direction and with a selected magnitude, and a second recess shaped and positioned relative to the first elongate recess to apply the spring force to the attachment in the selected direction and with the selected magnitude,
wherein the spring member is configured to receive the attachment, wherein the attachment is configured to affix to the at least one tooth, and wherein the spring member is configured to apply the spring force to the attachment to cause at least one of a rotation, a translation, a tipping, a torqueing, an extrusion, or an intrusion of the at least one tooth toward a desired position of the at least one tooth when the removable dental appliance is worn by the patient.

9. The system of claim 8, wherein the removable dental appliance comprises an aligner tray.

10. The system of claim 8, wherein the second recess is configured to reduce at least one of compression, strain, and tension otherwise present in the material of the spring member as spring member deforms when the first recess is engaged with the attachment.

11. The system of claim 10, wherein at least one of the first elongate recess or the second recess extends substantially through the shell.

12. The system of claim 10, wherein at least one of the first elongate recess or the second recess comprises a first dimension extending substantially perpendicular to a direction of the spring force and a second dimension extending substantially parallel to the direction of the spring force, and wherein the first dimension is greater than the second dimension.

13. The system of claim 10, wherein the first elongate recess is shaped to facilitate engagement of the spring member with the attachment in response to the removable dental appliance being positioned on the dental arch.

14. The system of claim 8, wherein a thickness of the appliance body increases near the spring member.

15. The system of claim 8, wherein the appliance body comprises a three-dimensionally printed polymeric material.

16. A method comprising:
receiving, by a computer, a digital representation of a three-dimensional (3D) dental anatomy of a patient, the dental anatomy providing initial positions of one or more teeth of the patient;
determining, by the computer, dimensions and shapes of a removable dental appliance for the patient, wherein the removable dental appliance comprises:
an appliance body configured to at least partially surround a plurality of teeth of a dental arch of the patient, the appliance body comprising a unitary material defining a shell shaped to receive at least one tooth of the patient and a spring member integrally formed with the shell, wherein the spring member includes a first recess defining an elongated slot extending through the appliance body and is configured to receive an attachment, and a second recess shaped and positioned relative to the first recess,
wherein the attachment is configured to affix to the at least one tooth, and wherein the spring member is configured to apply a spring force to the attachment to cause at least one of a rotation, a translation, a tipping, a torqueing, an extrusion, or an intrusion of the at least one tooth toward a desired position of the at least one tooth when the removable dental appliance is worn by the patient, wherein the second recess is shaped and positioned relative to the first recess to apply the spring force to the attachment in the selected direction and with the selected magnitude,
wherein the dimensions and shapes of the removable dental appliance are configured to reposition the one or more teeth of the patient from an initial position to a desired position when the removable dental appliance is worn by the patient, and wherein the dimensions and shapes of the removable dental appliance comprise:
a position, dimension, and shape of the shell;
a position, dimension, and shape of the attachment; and
a position, dimension, and shape of the spring member; and
transmitting, by the computer, a representation of the removable dental appliance to a computer-aided manufacturing system.

17. The method of claim 16, wherein the three-dimensional (3D) dental anatomy of the patient further comprises at least some portion of tooth roots, gingiva, periodontal ligaments, alveolar process, or cortical bone.

18. The method of claim 16, wherein determining, by the computer, dimensions and shapes of the removable dental appliance comprises selecting, by the computer, the dimensions and shapes of the removable dental appliance according to a set of predefined design constraints, the set of predefined design constraints including one or more of a group consisting of:
a maximum localized force applied to one or more teeth of the patient or the attachment when the removable dental appliance is worn by the patient;
a maximum rotational force applied to one or more teeth of the patient or the attachment when the removable dental appliance is worn by the patient;
a maximum translational force applied to one or more teeth of the patient or the attachment when the removable dental appliance is worn by the patient;
a maximum total force applied to one or more teeth of the patient or the attachment when the removable dental appliance is worn by the patient; and
a maximum strain applied to the removable dental appliance when worn by the patient.

19. The method of claim 16, wherein the second recess is configured to reduce at least one of compression, strain, and tension otherwise present in the material of spring member as the spring member deforms when the first recess is engaged with the attachment.

* * * * *

UNITED STATES PATENT AND TRADEMARK OFFICE
CERTIFICATE OF CORRECTION

PATENT NO. : 11,173,015 B2
APPLICATION NO. : 16/753886
DATED : November 16, 2021
INVENTOR(S) : Michael Domroese et al.

Page 1 of 1

It is certified that error appears in the above-identified patent and that said Letters Patent is hereby corrected as shown below:

In the Claims

Column 35
Line 47, In Claim 1, delete "a spring force" and insert -- the spring force --, therefor.

Column 36
Line 48, In Claim 10, before "spring member deforms", insert -- the --.

Column 38
Line 36 (approx.), In Claim 19, before "spring member", insert -- the --.

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*